(12) United States Patent
Nakamura

(10) Patent No.: US 7,804,563 B2
(45) Date of Patent: Sep. 28, 2010

(54) SUBSTRATE FOR LIQUID CRYSTAL DISPLAY DEVICE, LIQUID CRYSTAL DISPLAY ELEMENT, AND LIQUID CRYSTAL DISPLAY DEVICE

(75) Inventor: Hideyuki Nakamura, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 302 days.

(21) Appl. No.: 12/095,283

(22) PCT Filed: Nov. 27, 2006

(86) PCT No.: PCT/JP2006/323615

§ 371 (c)(1),
(2), (4) Date: May 28, 2008

(87) PCT Pub. No.: WO2007/063809

PCT Pub. Date: Jun. 7, 2007

(65) Prior Publication Data

US 2009/0122242 A1    May 14, 2009

(30) Foreign Application Priority Data

Nov. 29, 2005    (JP) .............................. 2005-344474

(51) Int. Cl.
*G02F 1/1339* (2006.01)
*G02F 1/1335* (2006.01)

(52) U.S. Cl. ...................... 349/110; 349/155
(58) Field of Classification Search ........................ None
See application file for complete search history.

(56) References Cited

U.S. PATENT DOCUMENTS

| 6,268,898 | B1 * | 7/2001 | Ihara ........................... 349/155 |
| 6,573,957 | B1 * | 6/2003 | Suzuki ......................... 349/73 |
| 7,113,249 | B2 * | 9/2006 | Honda et al. ................. 349/157 |
| 2004/0169797 | A1 * | 9/2004 | Fujita et al. ................. 349/110 |
| 2005/0264724 | A1 * | 12/2005 | Kim et al. .................... 349/110 |

(Continued)

FOREIGN PATENT DOCUMENTS

JP    04-090501    3/1992

(Continued)

OTHER PUBLICATIONS

Iwai, "Frontier of Liquid Crystal Business," p. 41, Kogyo Chosakai Publishing Inc., 1993 (in Japanese with English Translation), 4 pages.

(Continued)

*Primary Examiner*—Tina M Wong
(74) *Attorney, Agent, or Firm*—Sughrue Mion, PLLC

(57) ABSTRACT

A substrate for liquid crystal display includes at least: at least two substrates (a glass substrate and a TFT substrate); a liquid crystal layer disposed between the substrates; an ITO film that applies an electric field to the liquid crystal layer; a photospacer that regulates cell thickness (a thickness of a liquid crystal layer) between the substrates; a light-shielding film; and a colored layer, in which at least a part of the photospacer is formed on the light-shielding film or at a portion where the light-shielding film and the colored layer overlap; and the light-shielding film includes at least one of a resin and a precursor thereof and also includes metal particles having a silver-tin alloy portion.

9 Claims, 2 Drawing Sheets

U.S. PATENT DOCUMENTS

2006/0103789 A1*   5/2006   Takahashi et al. ........... 349/110

FOREIGN PATENT DOCUMENTS

| JP | 10-123534 | 5/1998 |
| JP | 2003-207787 A | 7/2003 |
| JP | 2006-227268 A | 8/2006 |

OTHER PUBLICATIONS

"Nikkei Microdevice Additional Volume, Flat Panel Display 2003," Mochizuki (ed.), published by Nikkei BP Inc., pp. 82-85 (Japanese with English translation), 12 pages.

"Nikkei Microdevice Additional Volume, Flat Panel Display 2003," Mochizuki (ed.), published by Nikkei BP Inc., p. 103 (Japanese with English translation), 3 pages.

* cited by examiner

SUBSTRATE FOR LIQUID CRYSTAL DISPLAY DEVICE, LIQUID CRYSTAL DISPLAY ELEMENT, AND LIQUID CRYSTAL DISPLAY DEVICE

TECHNICAL FIELD

The present invention relates to a substrate for liquid crystal display as well as to a liquid crystal display element and a liquid crystal display device using the substrate. The present invention relates to, in particular, a substrate for liquid crystal display suitable for use in a liquid crystal display device (element), in which fluctuations, if any, in cell thicknesses of liquid crystal cells tend to result in display unevenness, wherein the substrate includes a photospacer provided on a light-shielding film; and the invention further relates to a liquid crystal display element and a liquid crystal display device using the substrate.

BACKGROUND ART

A liquid crystal display device has been widely used in a display device that displays high quality images. In a liquid crystal display device, in general, a liquid crystal layer that allows image display based on a predetermined orientation is disposed between a pair of substrates. For the liquid crystal display device, one of factors that determine the image quality is to uniformly maintain the distance between the substrates, that is, the thickness of the liquid crystal layer. Accordingly, spacers are disposed to maintain the thickness of the liquid crystal layer constant. The thickness between the substrates is generally called a "cell thickness" and the cell thickness generally means a thickness of the liquid crystal layer. In other words, the cell thickness means a distance between two electrodes that apply an electric field to a liquid crystal in a display region.

Spacers have been formed conventionally by spreading beads. However, in recent years, spacers with high positional accuracy have been formed from photosensitive resin compositions by photolithography. Spacers formed from photosensitive resin compositions are called "photospacers."

The photospacer prepared from a photosensitive resin composition through steps of patterning, alkali development and baking tends to be poor in the compression strength of a spacer dot; accordingly, at the time of forming a panel, plastic deformation tends to be large. Therefore, the photospacer, when used in high quality image display, should not have a problem of non-uniformity or image unevenness caused by, for example, a reduction of the liquid crystal layer thickness to below the design value, which in turn caused by the above-mentioned tendency. Furthermore, it is as well important that an alkali development residue of the photosensitive resin composition is not generated in terms of obtaining a higher precision of a liquid crystal display device.

As a display mode of a liquid crystal display device, a TN mode has been adopted (see, for example, Non-patent Document 1). However, the TN mode has a problem in that a viewing angle thereof is narrow. Therefore, a VA mode that is wide in the viewing angle has been proposed (see, for example, Non-patent Document 2).

In the VA mode, the electric field generated between the electrodes is partially tilted by formation of a protrusion having a low dielectric constant, which is called a liquid crystal orientation control protrusion, on one or both of a pair of transparent electrodes disposed up and down, or by patterning of both of the pair of transparent electrodes disposed up and down (see, for example, Non-patent Document 3), whereby multiple domains are formed with respect to the orientation of the liquid crystal, which realizes a display device giving a similar brightness to all viewing angles. Among the VA modes, one that uses a liquid crystal orientation control protrusion is called MVA, ASV, CPA or the like, and one in which both of up and down transparent electrodes are patterned is called PVA.

However, the VA mode is one of display modes where variations in a cell thickness of a liquid crystal cell tend to cause display unevenness. Furthermore, some of other display modes such as an IPS mode and an OCB mode show similar tendencies.

Associated with the above, as a spacer formation technology for maintaining a constant thickness of a liquid crystal layer (cell thickness), it is disclosed to use a resin having an allyl group to form a spacer (see, for example, Patent Document 1).

Patent Document 1: Japanese Patent Application Laid-Open (SP-A) No. 2003-207787

Non-patent Document 1: Yoshihiro, Iwai "Frontier of Liquid Crystal Business," page 41 (published by Kogyo Chosakai Publishing Inc., 1993)

Non-patent Document 2: "Nikkei Microdevice Additional Volume, Flat Panel Display 2003" (Jitumuhen), pages 82 to 85, published by Nikkei BP Inc.

Non-patent Document 3: "Nikkei Microdevice Additional Volume, Flat Panel Display 2003" (Jitumuhen), page 103, published by Nikkei BP Inc.

DISCLOSURE OF THE INVENTION

Problem to be Solved by the Invention

According to a process that uses the resin having an allyl group, the uniformity of the spacers is improved. However, a problem remains whereby display unevenness in a liquid crystal display device is caused by variations in an underlayer; that is, by fluctuations in film thickness of a light-shielding film.

Accordingly, the present invention aims to provide the following: a substrate for liquid crystal display device having a light-shielding film and a photospacer with smaller film thickness fluctuations, which prevents display unevenness and enables display of high quality images, as well as a liquid crystal display element and a liquid crystal display device using the substrate.

Means for Solving a Problem

The present invention is achieved by using a thin-film high-density black matrix as a light-shielding Mm. Specific means for achieving the objects are as described below.

<1> A substrate for liquid crystal display, including at least: at least two substrates; a liquid crystal layer disposed between the substrates; an electrode that applies an electric field to the liquid crystal layer; a photospacer that regulates cell thickness between the substrates; a light-shielding film; and a colored layer, in which at least a part of the photospacer is formed on the light-shielding film or at a portion where the light-shielding film and the colored layer overlap, and the light-shielding film includes at least one of a resin and a precursor thereof and also includes metal particles having a silver-tin alloy portion.

<2> The substrate for liquid crystal display of the item <1>, in which the ratio of silver in the metal particles having the silver-tin alloy portion is in a range of 30 to 80% by mole.

<3> The substrate for liquid crystal display of the item <1> or <2>, in which an in-plane height variation of the light-shielding film is 0.2 μm or less in terms of 3σ (σ: a standard deviation among measurement points taken every 1 cm on a 1 m×1 m substrate).

<4> The substrate for liquid crystal display of claim 1 in which the amount of the metal particles in the light-shielding film is in a range of 5 to 20% by volume with respect to the total solid content of the light-shielding film.

<5> The substrate for liquid crystal display device of claim 1 in which the light-shielding film is formed by a coating process.

<6> The substrate for liquid crystal display device of claim 1, in which the light-shielding film is formed by a transfer process.

<7> The substrate for liquid crystal display device of claim 1, wherein the metal particles have a number-average particle size in a range of 20 nm to 700 nm.

<8> A liquid crystal display element including the substrate for liquid crystal display of the items <1> to <7>, <9> A liquid crystal display device including the liquid crystal display element of the item <8>.

EFFECT OF THE INVENTION

According to the present invention, a substrate for liquid crystal display device having a light-shielding film and a photospacer with less variations in the film thicknesses that prevents display unevenness and enable display of high quality images, as well as a liquid crystal display element and a liquid crystal display device using the substrate can be provided.

BEST MODE FOR CARRYING OUT THE INVENTION

Substrate for Liquid Crystal Display

A substrate for liquid crystal display of the present invention includes at least: at least two substrates; a liquid crystal layer disposed between the substrates; an electrode that applies an electric field to the liquid crystal layer; a photospacer that regulates cell thickness between the substrates; a light-shielding film; and a colored layer. The substrate constitutes a liquid crystal display element or the like that is used in a liquid crystal display device.

In the substrate for liquid crystal display of the invention, at least a part of the photospacer is formed on the light-shielding film or at a portion where the light-shielding film and the colored layer overlap, and the light-shielding film includes metal particles having a silver-tin alloy portion and at least one of a resin and a precursor thereof. The light-shielding film that is used in the substrate for liquid crystal display of the invention is a light-shielding film that includes a resin, a precursor thereof, and metal particles having a silver-tin alloy portion and is small in the fluctuations in film thickness. Accordingly, a cell thickness can be maintained uniform and display unevenness of an image display device can be prevented. Thereby, when the substrate for liquid crystal display device of the invention is used, an image display device capable of displaying high quality images can be formed.

Figure 1:
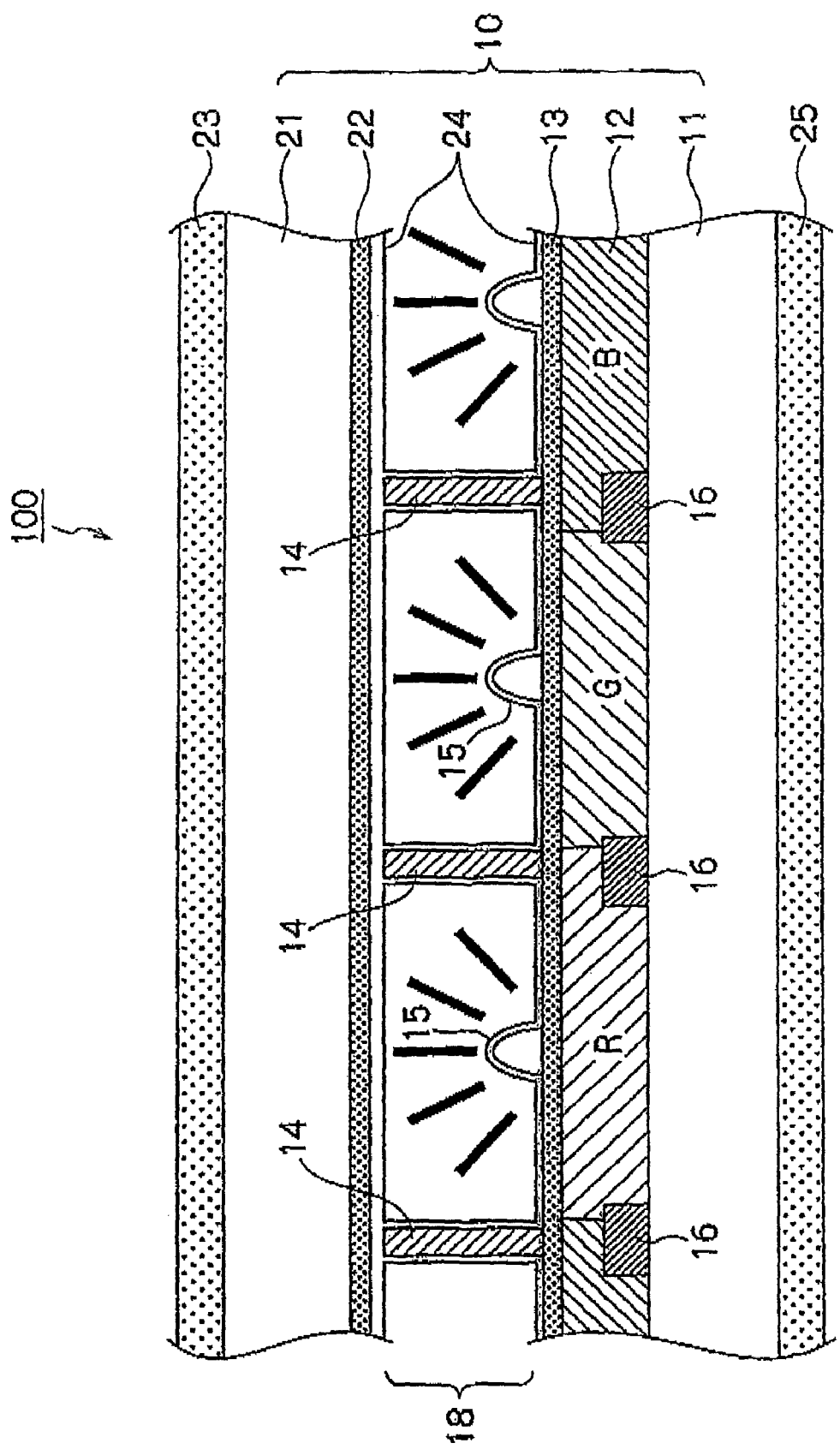
FIG. 1 is a schematic sectional view showing an example of a configuration of a MVA mode liquid crystal display element of the present invention.

As to a configuration of the substrate for image display of the invention, a configuration of a MVA mode liquid crystal display device will be described as an example with reference to FIG. 1. FIG. 1 is a schematic sectional view showing an example of a configuration of a MVA mode liquid crystal display element of the invention. In FIG. 1, a liquid crystal display element 100 of the invention includes a substrate for liquid crystal display 10 and polarization plates 23 and 25 and the substrate for liquid crystal display 10 is sandwiched between the two polarization plates.

The substrate for liquid crystal display device 10 is includes two substrates (a glass substrate 11 and a TFT substrate 21) and a liquid crystal layer 11 disposed between the two substrates. Furthermore, ITO Elms 13 and 22 are respectively formed on the substrates (the glass substrate 11 and the TFT substrate 21). The ITO films act as electrodes that apply an electric field to a liquid crystal layer 18.

In the invention, a material having the two substrates, the liquid crystal layer, the electrodes, the light-shielding film, the colored layer and the photospacer is called a "substrate for liquid crystal display", and a material obtained by providing a liquid crystal driving unit to the substrate for liquid crystal display is called a "liquid crystal display element."

A light-shielding film 16 and a colored layer 12 are disposed on that side of the glass substrate 11 where the liquid crystal layer 18 is to be disposed. A glass substrate 11-side ITO film 13 is formed on the colored layer 12. The colored layer 12 is constituted by combining pixels of red (R), green (G) and blue (B), respectively, and the colored layer 12 is disposed on the glass substrate 11 so that a part of each of the pixels overlaps with the light-shielding film 16.

Furthermore, between the respective substrates, photospacers 14 are disposed to maintain the thickness of the liquid crystal layer 18 constant. In FIG. 1, at least a part of the photospacers 14 is formed at a portion where the light-shielding film 16 and the colored layer 12 overlap. Furthermore, in FIG. 1, provided are a polyimide orientation film 24 and a rib 15 for imparting a local inclination to an electric field generated between the electrodes and forming multiple domains in terms of the orientation of the liquid crystal in the liquid crystal layer 18.

In the substrate for the liquid crystal display 10 of the invention, at least a part of the photospacers 14 is formed at a portion where the light-shielding film 16 and the colored layer 12 overlap. Accordingly, even when the height of the photospacers is small, a sufficient cell gap can be maintained.

Figure 2:
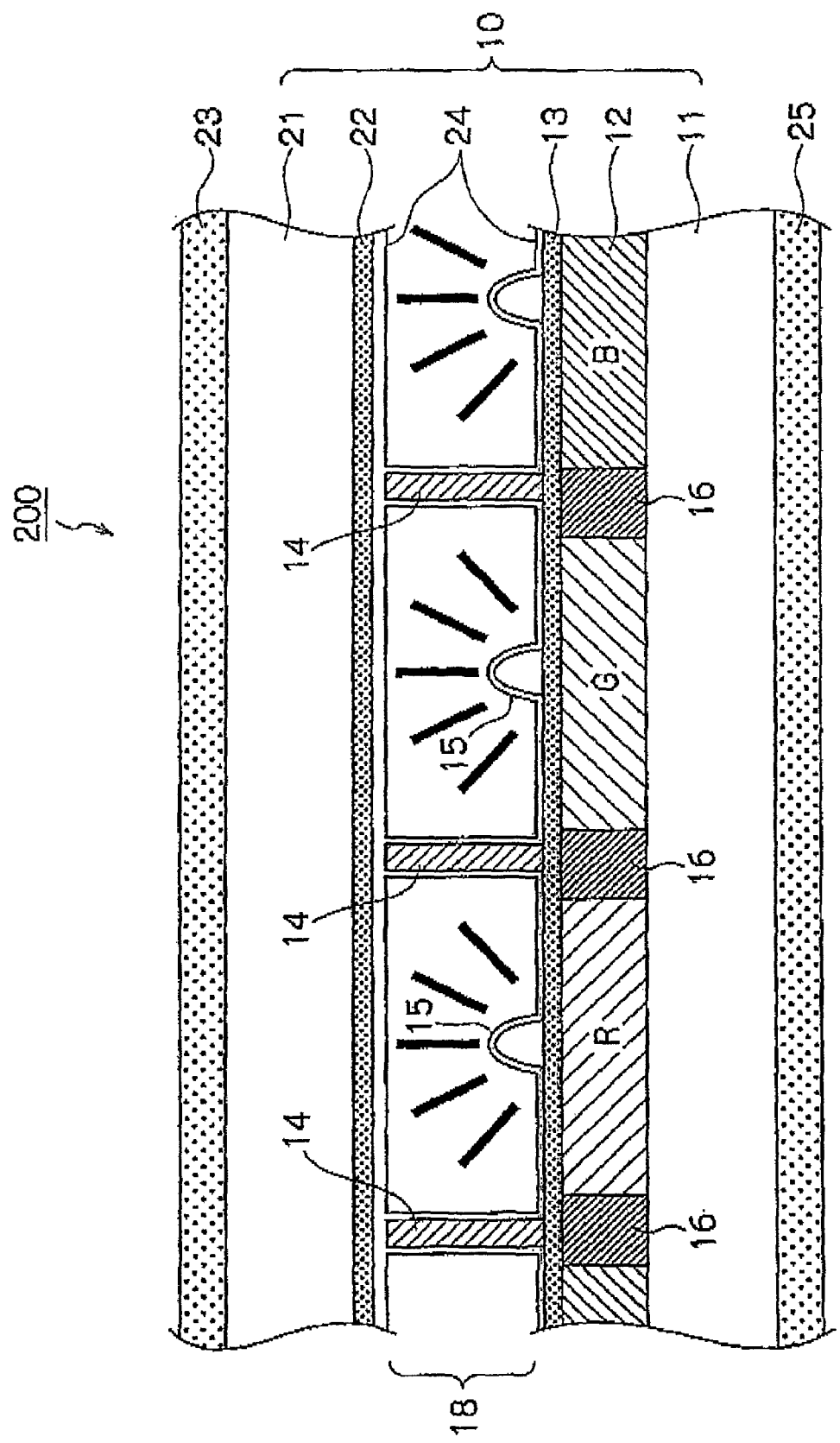
FIG. 2 is a schematic sectional view showing another example of a configuration of a MVA mode liquid crystal display element of the invention.

Furthermore, as shown in FIG. 2, a liquid crystal display element 200 of the invention may have a configuration in which a light-shielding film and respective colored layers do not overlap. FIG. 2 is a schematic sectional view showing another example of a configuration of a MVA mode liquid crystal display element of the invention. In FIG. 2, members indicated by the same reference numerals as in FIG. 1 are the same members as in FIG. 1.

In the liquid crystal display element 200, as shown in FIG. 2, at least a part of the photospacers 14 is formed on a light-shielding film 16. Accordingly, light leakage due to the photospacer 14 can be prevented.

As shown in FIGS. 1 and 2, in the invention, the photospacer may be formed above the colored layer or the light-shielding film with an ITO film or the like therebetween.

Hereinafter, the light-shielding film and the photospacer in the invention will be described in detail. Through the description, the substrate for a liquid crystal display, the liquid crystal display element and the liquid crystal display device of the invention will be described in detail.

<Light-Shielding Film>

A light-shielding film in the invention (hereinafter, may simply be referred to as "light-shielding film" or "black matrix") can be prepared by patterning a layer formed from a composition (preferably a resin composition for a recording material described below) that includes at least one of a resin and a precursor thereof and also includes metal particles having a silver-tin alloy portion, or by patterning a photosensitive resin layer formed from a photosensitive transfer material. A process of forming a light-shielding film by using the composition, that is, a process of patterning a layer formed from the composition, is not particularly restricted, and a known patterning process can be appropriately used.

The film thickness of the light-shielding film is preferably in the range of about 0.2 to about 2.0 μm and more preferably in the range of about 0.2 to about 0.9 μm. A film thickness of the light-shielding film within the above range is preferable since the flatness of the colored layer can be maintained even when a colored layer is laminated on the light-shielding film at least partially.

As to the in-plane variations of the height of the light-shielding film in the invention, $3\sigma$ is preferably 0.2 μm or less, more preferably 0.15 μm or less, and particularly preferably 0.10 μm or less, wherein $\sigma$ represents the standard deviation among measurement points given every 1 cm on a 1 m×1 m substrate. When the $3\sigma$ of the in-plane variation of the height of the light-shielding film is 0.2 μm or less, the cell thickness is unlikely to fluctuate. Accordingly, deterioration of the display grade by the fluctuations in cell thickness can be suppressed.

The standard deviation $\sigma$ is obtained by measuring the heights of the obtained light-shielding film for measurement points (10000 points) given every 1 cm on a 1 m×1 m substrate, by use of, for instance, a roughness meter (contact stylus profiler) P-10 (trade name, manufactured by TENCOR Corporation).

The light-shielding film in the invention is a film in which metal particles having a silver-tin alloy portion (hereinafter, in some cases, referred to as "metal particles in the invention") are dispersed in a resin or a precursor thereof. The light-shielding film can provide a high degree of optical density (4.0 or more) even with a small film thickness.

The form of the metal particles in the invention at the time of dispersion is not particularly restricted. However, the particles are preferably in a stable dispersion state. Furthermore, a dispersing agent described below may be used, as needs arise, in order to improve the dispersion state of the metal particles in the invention.

Furthermore, when the light-shielding film in the invention is formed using a resin composition for a recording material, the composition preferably includes at least a resin and a precursor thereof and the metal particles in the invention and may include other component(s) as needed, depending on the object, application, or the like.

Components of the resin composition for a recording material of the invention will be specifically described.

—Metal Particles Having Silver-Tin Alloy Portion—

The scope of the metal particles having a silver-tin alloy portion in the invention include metal particles each of which is made of a silver-tin alloy, metal particles each of which is made of a silver-tin alloy portion and other metal portion(s), or metal particles each of which is made of a silver-tin alloy portion and other alloy portion(s).

The metal used in the invention is defined as described in "Dictionary of Physics and Chemistry, Fourth Edition" (1987, published by Iwanami Shoten). The silver-tin alloy in the invention is an alloy in which silver and tin are mixed at an atomic level, and includes a solid solution, an eutectic crystal, a compound, an intermetallic compound, or the like. In addition, the alloy is described in, for instance, "Dictionary of Physics and Chemistry, Fourth Edition" (1987, published by Iwanami Shoten).

The fact that the metal particles having a silver-tin alloy portion in the invention are at least partially formed of a silver-tin alloy can be confirmed by measuring a spectrum of a 15 nm square area at the center of the respective particles under an accelerating voltage of 200 kV by use of, for instance, HD-2300 (trade name, manufactured by Hitachi Ltd.) and an EDS (Energy Dispersive X-ray Spectrometer) (manufactured by Noran Corporation).

The metal particles having a silver-tin alloy portion are high in the black density, and may exhibit excellent light shielding property at a small amount or even in a thin film and have high thermal stability. Accordingly, the metal particles allow heat treatment at high temperatures (such as 200° C. or more) without deterioration of the black density, thereby stably securing high light shielding property. The metal particles are suitable for a light-shielding film for a color filter (so-called black matrix), in which higher degree of the light shielding property is demanded.

The metal particles having a silver-tin alloy portion in the invention are obtained by making a composite (such as alloying) of silver (Ag) and tin (Sn) with a ratio of Ag set preferably in the range of 30 to 80% by mole. When the ratio of Ag is set particularly in the above range, high black density with high thermal stability in a high temperature region and suppressed reflectance of light can be obtained.

In other words, when the ratio of Ag is less than 30% by mole, the melting temperature is low and the metal particles tend to be changed by heat; accordingly, in some cases, the thermal stability is deteriorated. On the other hand, when the ratio of Ag exceeds 80% by mole, the reflectance of light is high. The ratio of silver (Ag) in the met particles in the invention is preferably in the range of 40 to 75% by mole and most preferably in the range of 50 to 75% by mole.

In particular, particles of which ratio of Ag is 75% by mole, that is, AgSn alloy particles are preferable because they are easy to prepare and obtained particles are stable.

The light-shielding film in the invention may include only one kind of metal particles having a silver-tin alloy portion, or may include two or more kinds of metal particles having silver-tin alloy portions having different ratios of Ag within the above range.

The metal particles in the invention can be formed according to a general process such as heating, melting and mixing in a crucible or the like to form an alloy. However, when a general process is used, the melting temperature of Ag is around 900° C., the melting temperature of Sn is around 200° C., which indicates a large difference between the melting temperatures of the metals; moreover, a fine particle forming step is necessary after the compositing (such as alloying). Accordingly, a particle reducing process where a composite forming step and a fine particle forming step are simultaneously carried out is preferred. That is, the particle reducing process is a process where a Ag compound and a Sn compound are mixed and reduced to simultaneously precipitate metallic Ag and metallic Sn at positions close to each other, whereby the composite formation (such as alloying) and the fine particle formation are simultaneously achieved. Furthermore, since Ag is readily reduced, and tend to be precipitated before Sn is precipitated, it is preferred to control the precipitation timing by using a complex salt(s) of Ag and/or Sn.

Preferable examples of the Ag compound include silver nitrate ($AgNO_3$), silver acetate ($Ag(CH_3COO)$) and silver perchlorate ($AgClO_4.H_2O$), and, among these, silver acetate is preferred.

Preferable examples of the Sn compound include stannous chloride ($SnCl_2$), stannic chloride ($SnCl_4$) and stannous acetate ($Sn(CH_3COO)_2$), and, among these, stannous acetate is preferred.

Examples of preferable reduction processes include a process that uses a reducing agent and a process where the reduction is carried by electrolysis. Among these, a process that uses a reducing agent is preferred because fine particles are obtained. Examples of the reducing agent include hydroquinone, catechol, para-aminophenol, para-phenylenediamine and hydroxyacetone. Among these, hydroxyacetone is particularly preferred because it is readily volatilized and unlikely to adversely affect a display device.

The metal particles having a silver-tin alloy portion in the invention are preferably particles that have the physical properties, the particle size, the particle shape and the like described below.

The metal particles in the invention are preferably particles having a melting temperature in the range of 240 to 400° C. when measured by differential scanning calorimetry (DSC). Since the melting temperature is in the range, a thermal stability is exhibited that is superior to that of metallic Ag (melting temperature: 950° C.) and metallic Sn (melting temperature: 230° C.).

Specifically, the melting property (melting temperature) of a AgSn alloy is determined by setting 20 mg of the AgSn alloy as a sample to a measurement cell of a DSC (trade name: SSC/5200, manufactured by Seiko Instruments Co., Ltd.) and measuring a peak in DSC derived from crystallization during temperature decrease by cooling from 200° C. to room temperature at a temperature-decreasing speed of 10° C./min.

The metal particles in the invention have a number average particle size preferably in the range of 20 to 700 nm, more preferably in the range of 30 to 200 nm and particularly preferably in the range of 40 to 100 nm. Unlike particles of metallic Sn, black hue is exhibited at any particle size so far as the number average particle size is within the above range. When the number average particle size exceeds 700 nm, in some cases, a surface state is deteriorated when a film is formed and, when the number average particle size is less than 20 nm, in some cases, the blackness is diminished to take a yellow tinge.

The number average particle size is measured as shown below using a photograph obtained by use of a transmission electron microscope JEM-2021 (trade name, manufactured by JEOL Ltd.).

100 particles are selected. The diameter of the circle having the same area as that of each particle image is assumed to be the particle diameter, and the average of the particle diameters of 100 particles is taken as a number average particle size. The photograph to be used is a photograph obtained at a magnification of 100,000 under an accelerating voltage of 200 kV.

Examples of the particle shape of the "metal particle having a silver-tin alloy portion" in the invention include, without particular restriction, any of a cubic shape, a high aspect shape, a medium aspect shape and a needle shape.

As far as the metal particles has and retains at least the above-mentioned physical properties, particle size and particle shape are, the metal particles may further include a salt, an organic material, other element(s) (such as Ca, P, and Na) or the like, in addition to the elements (Ag and Sn) that form metal particles having a silver-tin alloy portion.

The content of the metal particles in the invention in the light-shielding film in the invention is, from the viewpoint of obtaining high light shielding properties, preferably in the range of 5 to 20% by volume, more preferably in the range of 7 to 15% by volume and most preferably in the range of 3 to 15% by volume with respect to the total solid content (volume) in the light-shielding film. When the content of the metal particles having a silver-tin alloy portion is particularly in the above range, the reflectance of light is reduced and the black density is high, so that high light shielding properties are obtained with a thin film. Accordingly, when the light-shielding film is incorporated in a liquid crystal display device, a clear display image with high contrast can be obtained. When an amount of the metal particles having a silver-tin alloy portion is less than 5% by volume, display contrast is deteriorated in some cases due to high reflectance, and, when the amount of the metal particles having a silver-tin alloy portion exceeds 20% by volume, the thickness of an obtained film exceeds 1 μm in some cases.

Furthermore, regarding the relationship with a resin and a precursor thereof described below, the content of the metal particles having a silver-tin alloy portion in the light-shielding film is preferably in the range of 0.3 to 8.0% by mass and more preferably in the range of 0.5 to 3.0% by mass with respect to the total amount (mass) of the resin and the precursor thereof.

—Resin and Precursor Thereof—

The light-shielding film of the invention includes at least one of a resin and a precursor thereof. The resin is a polymer component that serves as a binder, and the precursor of the resin is a component that forms a resin upon polymerization and includes a so-called monomer component or oligomer component.

When the light-shielding film in the invention is formed using the resin composition for a recording material, the resin and the precursor thereof in the invention may be appropriately selected in accordance with the type of the resin composition for a recording material.

Furthermore, in the case where the light-shielding film in the invention is formed using the resin composition for a recording material, it is preferable that one kind or two or more kinds selected from resins and precursors thereof is/are included in the composition to constitute a photosensitive polymerizable composition. For instance, photosensitivity can be imparted to the resin composition for a recording material, by using a photosensitive resin composition.

The resin composition for a recording material, to which photosensitivity is imparted, includes a binder (polymer), a photopolymerization initiator and a monomer that includes an ethylenically unsaturated double bond and is addition-polymerizable by light (hereinafter, in some cases, referred to as "photopolymerizable monomer").

The resin composition for a recording material can be developed with an alkali aqueous solution or developed with an organic solvent. From the viewpoint of the safety and the cost of a developer, a resin composition that is developed with an alkali aqueous solution is preferred.

The resin composition for a recording material may be of a negative type where a portion that receives radiation such as light and an electron beam is cured or of a positive type where a portion that does not receive radiation is cured.

As the resin and the precursor thereof a novolak resin may be used when, for instance, a light-shielding film in the invention is formed from a resin composition for a positive recording material. As the novolak resin, alkali-soluble novolak resins described in, for instance, JP-A No. 7-43899 may be used. Furthermore, a photosensitive resin that contains a mixture that includes a positive photosensitive resin described in the JP-A No. 6-148888, that is, an alkali-soluble resin described in the publication, 1,2-naphthoquinonediazide sulfonic acid ester as a photo-sensitizer and a thermosetting agent described in the publication may be used. In this case, the photosensitive resin is thermosetting. Furthermore, a composition described in JP-A No. 5-262850 may also be used.

Furthermore, for instance, when a light-shielding film in the invention is formed from a resin composition for a negative recording material, examples of the resin composition for a negative recording material include a photosensitive resin made of a negative diazo resin and a binder, a photopolymerizable composition, a resin composition for a recording material which includes an azide compound and a binder, and a resin composition for a cinnamic acid recording material. A particularly preferable example among these is a photopolymerizable composition that includes, as main constituents, a photopolymerization initiator, a photopolymerizable monomer and a binder. Examples of the photopolymerizable composition include "a polymerizing compound B," "a polymerization initiator C," "a surfactant," and "an adhesion aid" that are described in JP-A No. 11-133600 and other compositions.

For instance, an example of the resin composition for a negative recording material, which can be developed with an alkali aqueous solution, is a composition that includes, as main components, a binder containing a carboxylic acid group (alkali-soluble binder such as an alkali-soluble thermoplastic resin), a photopolymerization initiator and an ethylenically unsaturated double bond-containing monomer (photopolymerizable polymer) that can be addition-polymerized by irradiation of light.

Examples of the binder include polymers having a carboxylic acid group in a side chain thereof, such as a methacrylic acid copolymer, an acrylic acid copolymer, an itaconic acid copolymer, a crotonic acid copolymer, a maleic acid copolymer and a partially-esterified maleic acid copolymer, which are described in, for instance, JP-A No. 59-44615, Japanese Patent Application Publication (JP-B) Nos. 54-34327, 58-12577 and 54-25957, JP-A Nos. 59-53836 and 59-71048. Furthermore, a cellulose derivative having a carboxylic acid group in a side chain thereof may be cited as well. Other than these, one obtained by adding a cyclic acid anhydride to a polymer having a hydroxyl group is preferably used. In particular, a copolymer of benzyl (meth)acrylate and (meth)acrylic acid and a multicomponent copolymer of benzyl (meth)acrylate, (meth)acrylic acid and another monomer, which is described in U.S. Pat. No. 4,139,391, may be cited as well.

As the binder, a binder that has an acid value in the range of 30 to 400 mg KOH/g and a weight average molecular weight in the range of 1000 to 300000 is preferably selected. Other than the above, in order to improve various characteristics such as the mechanical strength of a cured film, an alkali-insoluble polymer may be added to the binder in a range that does not adversely affect the developability and the like. As the alkali-insoluble polymer, an alcohol-soluble nylon or an epoxy resin may be cited.

The resin and the precursor thereof is added, in the light-shielding film of the invention, usually in the range of 10 to 95% by mass and preferably in the range of 20 to 90% by mass with respect to the total solid content of the resin composition for a recording material. When the amount is in the range of 10 to 95% by mass, the viscosity of the photosensitive resin layer is not too high and the mechanical strength and the light sensitivity of the obtained layer are not inferior.

As mentioned above, a light-shielding film of the invention cat be formed from a resin composition for a photosensitive recording material, and the composition may include a photopolymerization initiator and a photopolymerizable monomer.

—Photopolymerization Initiator—

Examples of the photopolymerization initiator include vicinal polyketaldonyl compounds disclosed in U.S. Pat. No. 2,367,660, acyloin ether compounds described in U.S. Pat. No. 2,448,828, aromatic acyloin compounds substituted by α-hydrocarbon described in U.S. Pat. No. 2,722,512, polynuclear quinone compounds described in U.S. Pat. Nos. 3,046,127 and 2,951,758, a combination of a triaryl imidazole dimer and p-aminoketone described in U.S. Pat. No. 3,549,367, benzothiazole compounds and trihalomethyl-s-triazine compounds described in JP-B No. 5148516, trihalomethyl-s-triazine compounds described in U.S. Pat. No. 4,239,850, and trihalomethyl oxadiazole compounds described in U.S. Pat. No. 4,212,976. Among these, trihalomethyl-s-triazine, trihalomethyl oxadiazole and triaryl imidazole dimer are particularly preferable. Other than these, the "polymerization initiator C" described in JP-A No. 11-133600 as well is preferably cited.

The photopolymerization initiators may be used singly or in a combination of two kinds or more thereof. The combinations of two or more kinds thereof are particularly preferred.

Furthermore, the amount of the photopolymerization initiator with respect to the total solid content of the resin composition for a recording material is generally in the range of 0.5 to 20% by mass and preferably in the range of 1 to 15% by mass.

Examples of the photopolymerization initiator that is high in exposure sensitivity, less in discoloration such as yellowing and excellent in display characteristics include combinations of diazole photopolymerization initiators and triazine photopolymerization initiators. Among these, a combination of 2-trichloromethyl-5-(p-styrylstyryl)-1,3,4-oxadiazole and 2,4-bis(trichloromethyl)-6-[4'-(N,N-bisethoxycarbonylmethylamino)-3'-bromophenyl]-s-triazine is most preferred.

The ratio of the photopolymerization initiators is, in terms of a mass ratio of diazole photoinitiator to triazine photoinitiator, preferably in the range of 95/5 to 20/80, more preferably in the range of 90/10 to 30/70 and most preferably in the range of 80/20 to 60/40.

Examples of the photopolymerization initiator include those described in JP-A Nos. 1-152449, 1-254918 and 2-153353.

Further preferable examples include benzophenone photoinitiators.

When the ratio of metal particles in the invention to the total solid content of the resin composition for a recording material is in or around the range of 5 to 20% by volume, similar effects can be obtained by mixing a coumarin compound with the photopolymerization initiator. As the coumarin compound, 7-[2-[4-(3-hydroxymethylpyperidino)-6-diethylamino]triazinylamino]-3-phenyl coumarin is most preferred.

Regarding the ratio of the photopolymerization initiator to the coumarin compound, the mass ratio of the photopolymerization initiator to the coumarin compound (photopolymerization initiator/coumarin compound) is preferably in the range of 20/80 to 80/20, more preferably in the range of 30/70 to 70/30 and most preferably in the range of 40/60 to 60/40.

However, the photopolymerizable composition that can be used in the invention is not restricted to the above, and may be appropriately selected from known photopolymerizable compositions.

The amount of the photopolymerization initiator is usually in the range of 0.5 to 20% by mass and preferably in the range of 1 to 15% by mass with respect to the total solid content of the resin composition for a recording material. When the amount is within the above range, reduction in the photosensitivity and the mechanical strength of images can be prevented, and thereby, the performance can be sufficiently improved.

—Photopolymerizable Monomer—

As the photopolymerizable monomer, compounds of which boiling temperature is 100° C. or more under normal pressure may be cited. Examples thereof include monofunctional (meth)acrylates such as polyethylene glycol mono (meth)acrylate, polypropylene glycol mono(meth)acrylate and phenoxyethyl (meth)acrylate; and multi-functional (meth)acrylates such as polyethylene glycol di(meth)acrylate, polypropylene glycol di(meth)acrylate, trimethylolethane triacrylate, trimethylolpropane triacrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane ti(acryloyloxypropyl)ether, tri(acryloyloxyethyl)isocyanurate, tri(acryloyloxyethyl) cyanurate, glycerin tri(met)acrylate and one obtained by adding ethylene oxide or propylene oxide to multi-functional alcohols such as trimethylol propane or glycerin followed by converting into (meth)acrylate.

Additional examples of the photopolymerizable monomer include multi-functional acrylates and methacrylates including urethane acrylates such as those described in JP-B Nos. 48-41708 and 50-6034 and JP-A No. 51-37193; polyester acrylates such as those described in JP-A No. 48-64183 and JP-B Nos. 49-43191 and 52-30490; and epoxyacrylates which are reaction products of epoxy resin and (meth)acrylic acid. Among these, trimethylolpropane tri(meth)acrylate, pentaerythritol tetra(meth)acrylate, dipentaerythritol hexa (meth)acrylate and dipentaerythritol penta(meth)acrylate are preferable.

The photopolymerizable monomers may be used singly or in a combination of two or more kinds thereof.

The amount of the photopolymerizable monomer with respect to the total solid content of a resin composition for a recording material is generally in the range of 5 to 50% by mass and preferably in the range of 10 to 40% by mass, when the amount is set in the above range, reduction in the photosensitivity and the mechanical strength of images is does not occur, and the stickiness of a photosensitive light-shielding film is not excessive.

The resin composition for a recording material preferably further includes, other than the above components, a thermal polymerization inhibitor. Examples of the thermal polymerization inhibitor include aromatic hydroxy compounds such as hydroquinone, p-methoxyphenol, p-t-butylcatechol, 2,6-di-t-butyl-p-cresol, β-naphthol and pyrogallol; quinones such as benzoquinone and p-toluquinone; amines such as naphthylamine, pyridine, p-toluidine and phenothiazine; aluminum salt or ammonium salt of N-nitrosophenylhydroxyamine, chloranil, nitrobenzene, 4,4'-thiobis(3-methyl-6-t-butylphenol), 2,2'-methylenebis(4-methyl-6-t-butylphenol) and 2-mercaptobenzimidazole.

To the resin composition for a recording material, as needs arise, a known additive such as a plasticizer, a surfactant, an adhesion promoter, a dispersing agent, a plasticizer, an anti-sagging agent, a leveling agent, an antifoaming agent, a fire retardant, a gloss agent or a solvent may be added, —Adhesion Promoter—

Examples of the adhesion promoter include an alkyl phenol/formaldehyde novolak resin, polyvinyl ethyl ether, polyvinyl isobutyl ether, polyvinyl butyral, polyisobutylene, styrene-butadiene copolymer rubber, butyl rubber, a vinyl chloride-vinyl acetate copolymer, chlorinated rubber, an acrylic resin adhesive, an aromatic, aliphatic or alicyclic petroleum resin and a silane coupling agent.

Furthermore, when at least one kind of metal particles of the invention are used in the form of an aqueous dispersion, the resin composition for a recording material may be an aqueous composition. Examples of the aqueous resin composition for a recording material include those described in paragraphs [0015] to [0023] of JP-A No. 8-271727 and commercially available ones such as "SPP-M20" (trade name, manufactured by Toyo Gosei Co., Ltd.).

—Surfactant—

As the surfactant, one miscible with the constituent components of the resin composition for a recording material (or of the photosensitive resin layer) may be used without particular restriction. Examples of preferable surfactants include surfactants described in paragraphs [0015] to [0024] of JP-A No. 2003-337424, paragraphs [0012] to [0017] of JP-A No. 2003-177522, paragraphs [0012] to [0015] of JP-A No. 2003-177523, paragraphs [0010] to [0013] of JP-A No. 2003-177521, paragraphs [0010] to [0013] of JP-A No. 2003-177519, paragraphs [0012] to [0015] of IP-A No. 2003-177520, paragraphs [0034] to [0035] of JP-A No. 11-133600, and JP-A No. 6-16684.

From the viewpoint of obtaining superior effects, it is preferable to select one kind or two or more kinds from fluorinated surfactants and/or silicone surfactants (including a fluorinated surfactant or a silicone surfactant, a surfactant that includes both of a fluorine atom and a silicon atom), with a fluorinated surfactant being most preferred.

When the fluorinated surfactant is used, the number of fluorine atoms in the fluorine-containing substituent(s) in a molecule of the surfactant is preferably in the range of 1 to 38, more preferably in the range of 5 to 25 and most preferably in the range of 7 to 20. A number of fluorine atoms within the range are preferable since the solubility is excellent and an unevenness improvement effect is obtained within the range.

—Solvent—

When the resin composition for a recording material is prepared, an organic solvent may be used in addition to the components. Examples of the organic solvent include methyl ethyl ketone, propylene glycol monomethyl ether, propylene glycol monomethyl ether acetate, cyclohexanone, cyclohexanol, methyl isobutyl ketone, ethyl lactate, methyl lactate and caprolactam.

—UV Absorber—

The resin composition for a recording material may include a UV absorber, as needs arise. Examples of the UV absorber include compounds described in JP-A No. 5-72724, and salicylate-based, benzophenone-based, benzotriazole-based, cyanoacrylate-based, nickel chelate-based and hindered amine-based UV absorbers.

Specific examples thereof include phenyl salicylate, 4-t-butylphenyl salicylate, 2,4-di-t-butylphenyl-3',5'-di-t-4'-hydroxybenzoate, 4-t-butylphenyl salicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzotriazole, 2-(2'-hydroxy-3"-t-butyl-5'-methylphenyl)-5-chlorobenzotriazole, ethyl-2-cyano-3,3-diphenyl acrylate, 2,2'-hydroxy-4-methoxybenzophenone, nickel dibutyldithiocarbamate, bis(2,2,6,6-tetramethyl-4-pyridine)-sebacate, 4-t-butylphenyl salicylate, phenyl salicylate, 4-hydroxy-2,2,6,6-tetramethylpiperidine condensate, succinic acid-bis(2,2,6,6-tetramethyl-4-piperidenyl)ester, 2-[2-hydroxy-3,5-bis(α,α-dimethylbenzyl)phenyl]-2H-benzothiazole and 7-{[4-chloro-6-(diethylamino)-5-triazine-2-yl]amino}-3-phenyl coumarin.

Furthermore, the resin composition for a recording material may contain, other than the additives, an "adhesion aid" and other additives described in paragraph [0036] of JP-A No. 11-133600.

The resin composition for a recording material is used to prepare a recording material. The "recording material" in the invention means a material, such as a light-shielding film, that forms an image by use of light, heat, an electron beam, an electrostatic force, a magnetic force, a physical force, or the like. As a specific recording method, a photolithography method, an ink-jet method and silver salt photography are cited, and the recording material refers to a material used for the methods.

The resin composition for a recording material (including photosensitive and/or thermosetting resin composition(s)) may be preferably used to prepare a light-shielding film (such as a black matrix that forms a color filter) in the invention. When the black matrix is formed, the obtained black matrix is thin, and high in optical density, and enables display of a clear image at high contrast when an image is displayed.

(Process of Forming Light-Shielding Film>

<Process of Forming Light-Shielding Film, and Photosensitive Transfer Material)

The light-shielding film in the invention includes at least one of a resin and a precursor thereof and also includes metal particles in the invention, may further include another component, and may particularly preferably be constituted by use of the resin composition for a recording material. When the resin composition for a recording material, which includes the precursor of a resin, is used, the light-shielding film in the invention may include an unreacted precursor.

The light-shielding film of the invention may be formed according to any one of: a process (coating process) where a resin composition that includes at least one of a resin and a precursor thereof and also includes metal particles in the invention is prepared, and the composition is applied and dried to form a resin layer (including a photosensitive resin layer), followed by patterning and a process (transfer process) where a transfer material on which a layer of the composition is disposed is prepared, followed by transferring the layer to form a photosensitive resin layer, followed by patterning. The method of patterning is not particularly restricted and details thereof will be described below.

The resin layer (including photosensitive resin layer) can be preferably formed by applying the resin composition for recording material by a known coating process, followed by drying. In the invention, a slit-like nozzle having a slit-like hole at a portion from which a liquid is discharged is preferably used for applying the resin composition.

Specifically, the slit-like nozzles and slit coaters described in JP-A Nos. 2004-89851, 2004-17043, 2003-170098, 2003-164787, 2003-10767, 2002-79163 and 2001-310147 are preferably employed. Alternatively, the resin layer may be formed by applying and drying a solution of the resin composition for recording material by use of a coating machine such as a spinner, a whiler, a roll coater, a curtain coater, a knife coater, a wire bar coater or an extruder.

Furthermore, in the case where the transfer process is used, a photosensitive resin layer can be formed from a photosensitive transfer material described below, by transferring the photosensitive resin layer on a substrate that is a final support.

—Photosensitive Transfer Material—

In the next place, a photosensitive transfer material that is used when the transfer process is used will be described.

As mentioned above, a light-shielding film (such as black matrix) in the invention can be prepared by preparing a photosensitive transfer material having a photosensitive resin layer formed from a composition including metal particles in the invention, in particular, a photosensitive resin composition for a recording material, and carrying out a transfer process with the photosensitive transfer material.

In the photosensitive transfer material, a photosensitive resin layer including metal particles in the invention, in particular, a photosensitive resin layer constituted of a resin composition for a recording material, is disposed. Accordingly, a light-shielding film that is excellent in the thermal stability even in a high temperature region, thin in the film thickness and high in the optical density can be most preferably prepared.

The photosensitive transfer material includes a temporary support and a photosensitive resin layer formed thereon by using a resin composition for a recording material and, as needs arise, the photosensitive transfer material may include a thermoplastic resin layer, an intermediate layer, a protective film or the like.

The layer thickness of the photosensitive resin layer is preferably in the range of 0.2 to 2 μm and particularly preferably in the range of 0.2 to 0.9 μM from the viewpoint of easiness of forming the photosensitive resin layer.

A temporary support, a thermoplastic resin layer and an intermediate layer are described in paragraphs [0061] to [0070] of SP-A No. 2005-17322, and, in the invention as well, the description may be referenced.

—Thermoplastic Resin Layer—

The photosensitive transfer material may include, between the photosensitive resin layer and the temporary support, at least one thermoplastic resin layer. The thermoplastic resin layer is preferably alkali-soluble from the viewpoints of enabling alkali development and prevention of contamination of the receiving material by the thermoplastic resin layer itself that has protruded at the time of transferring.

When the photosensitive resin layer is transferred to a receiving material, the thermoplastic resin layer has a function as a cushion material that effectively prevents transfer defects due to unevenness present on the receiving material. That is, when a photosensitive transfer material is pressure bonded to a receiving material under heating, the thermoplastic resin layer can deform in accordance with the unevenness on the receiving material so that the adhesiveness between the photosensitive resin layer and the receiving material can be increased.

The layer thickness of the thermoplastic resin layer is preferably in the range of 0.1 to 20 μm. When the layer thickness is within the above range, the peelability from the temporary support during the transferring is excellent and the unevenness on the receiving material is effectively absorbed. Accordingly, reticulations in the photosensitive resin layer, which may cause transfer defects, do not occur. Furthermore, the layer thickness is preferably in the range of 1.5 to 16 μm and more preferably in the range of 5 to 15.0 μm.

The reticulation means generation of fine "fold" on a surface of the photosensitive resin layer caused by buckling of a soft cushion layer when an intermediate layer elongates due to moisture adsorption or the like, and may cause transfer defects.

The thermoplastic resin layer may be constituted with at least a thermoplastic resin and, as needs arise, may appropriately include other component(s). The thermoplastic resin may be appropriately selected without particular restriction, and is preferably one having a substantial softening temperature of 80° C. or less.

Examples of the thermoplastic resin that have a substantial softening temperature of 80° C. or less preferably include a saponified material of ethylene and an acrylic acid ester copolymer, a saponified material of styrene and a (meth) acrylic acid ester copolymer, a saponified material of vinyl toluene and a (meth)acrylic acid ester copolymer, and a saponified material of a poly(meth)acrylic acid ester or a (meth)acrylic acid ester copolymer of butyl (met)acrylate and vinyl acetate. Furthermore, among organic polymers that are described in "Purasutikku Seinou Binran," edited by Sapan Plastics Industry Federation and Zennihon Purastikcu Seikei Kogyo Rengokai (Published from Kogyo Chosakai, Oct. 25, 1968) and have a substantial softening temperature of 80° C. or less, alkali-soluble organic polymers may be cited. These polymers may be used singly or in a combination of two or more kinds thereof.

Furthermore, as a thermoplastic resin that has a substantial softening temperature 80° C. or less, a resin may be mentioned which is obtained by adding, to an organic polymer having a softening temperature of 80° C. or more, any of various kinds of plasticizers compatible with the organic polymer which reduces the substantial softening temperature to 80° C. or less. The plasticizer may be, without particular restriction, appropriately selected in accordance with the purpose. Examples thereof include polypropylene glycol, polyethylene glycol, dioctyl phthalate, diheptyl phthalate, dibutyl phthalate, tricresyl phosphate, cresyldiphenyl phosphate and biphenyldiphenyl phosphate.

To a thermoplastic resin layer, various kinds of polymers, a supercooling material, an adhesiveness improver, a surfactant, a mold releaser or the like as components other than the thermoplastic resin may be added within a range where the substantial softening temperature of the thermoplastic resin does not exceed 80° C., in order to control the adhesive force with the temporary support.

—Intermediate Layer—

The photosensitive transfer material preferably includes an intermediate layer in order to prevent intermixing of components during the coating of plural layers and storage after the coating. In particular, the intermediate layer is preferably disposed above the thermoplastic resin layer that has been formed on the temporary support, and between the thermoplastic resin layer and the photosensitive resin layer. The thermoplastic resin layer and the photosensitive resin layer are formed by using an organic solvent. However, the intermixing of the two layers is prevented when the intermediate layer is disposed.

As an intermediate layer, one that disperses or dissolves in water or an alkali aqueous solution is preferred. Known constituent materials may be used for the intermediate layer. Examples thereof are described in JP-A No. 46-2121 and JP-B No. 56-40824 and include a polyvinyl ether/maleic anhydride polymer, a water-soluble salt of a carboxyalkyl cellulose, water-soluble cellulose ethers, a water-soluble salt of a carboxyalkyl starch, polyvinyl alcohol, polyvinyl pyrrolidone, polyacrylamides, water-soluble polyamide, a water-soluble salt of polyacrylic acid, gelatin, an ethylene oxide polymer, a water-soluble salt of a class composed of various kinds of starches and analogues thereof, a copolymer of styrene/maleic acid and a maleate resin.

These may be used singly or in a combination of two kinds or more thereof.

Among these, water-soluble resins, that is, water-soluble polymer materials are preferably used. It is preferable to use at least polyvinyl alcohol among them, and use of a combination of polyvinyl alcohol and a polyvinyl pyrrolidone is particularly preferable.

The polyvinyl alcohol, without particular restriction, may be appropriately selected in accordance with the purpose. However, the saponification degree of the polyvinyl alcohol is preferably 80% by mole or more.

The amount of polyvinylpyrrolidone is preferably in the range of 1 to 75% by mass, more preferably in the range of 1 to 60% by mass and most preferably in the range of 10 to 50% by mass with respect to the solid content of the intermediate layer. When the amount is within the above range, sufficient adhesiveness to the thermoplastic resin layer can be obtained and the oxygen impermeability is also excellent.

The intermediate layer preferably has a small oxygen permeability. That is, the intermediate layer is preferably constituted from an oxygen impermeable film having oxygen impermeability. Thereby, the sensitivity at exposure to light is improved so that the time load of an exposing device may be reduced, leading to improvement in the productivity and improvement in the resolution as well.

The layer thickness of an intermediate layer is preferably in or around the range of 0.1 to 5 μm and more preferably in the range of 0.5 to 2 μm. When the thickness of the intermediate layer is within the above range, the oxygen impermeability is not deteriorated and an increase in the time required for removing the intermediate layer during development can be prevented.

—Temporary Support—

The temporary support preferably has peelability from the thermoplastic resin layer to an extent that does not disturb the transfer, and preferably has chemical and thermal stability and flexibility.

The material of the temporary support, without particular restriction, may be appropriately selected in accordance with the purpose. Examples thereof include polytetrafluoroethylene, polyethylene terephthalate, polyethylene naphthalate, polycarbonate, polyethylene and polypropylene.

The structure of the temporary support, without particular restriction, may be appropriately selected in accordance with the purpose, and may be any one of a single layer structure and a laminate structure. Furthermore, it is preferred that the temporary support is neither subjected to a surface treatment such as glow discharge nor provided with an undercoat layer such as gelatin, from the viewpoint of securing excellent peelability from the thermoplastic resin layer.

The thickness of the temporary support is preferably in or around the range of 5 to 300 μm and preferably in the range of 20 to 150 μm.

The temporary support preferably has an electroconductive layer on at least one of surfaces thereof, or is electroconductive itself when the temporary support has electroconductivity, the temporary support and the receiving material do not attract dust or the like in the surroundings through electrification when the temporary support is peeled off after a photosensitive transfer material having the temporary support is closely attached to the receiving material. As a result, even after the temporary support is peeled, the dust or the like does not adhere onto the thermoplastic resin layer, and generation of pinholes, which may occur owing to the presence of unwanted unexposed portions in a subsequent exposure process, are effectively prevented. The surface electric resistance of the electroconductive layer on the temporary support or of a surface of the temporary support having electroconductivity is preferably $10^{13} \Omega$ or less.

The temporary support having electroconductivity can be obtained by incorporating an electroconductive material into a temporary support. The electroconductive material, without particular restriction, may be appropriately selected in accordance with the purpose. Examples thereof include a metal oxide and an antistatic agent.

Examples of the metal oxide include zinc oxide, titanium oxide, tin oxide, aluminum oxide, indium oxide, silicon oxide, magnesium oxide, barium oxide and molybdenum oxide. These may be used singly or in a combination of two kinds or more thereof. Furthermore, examples of the form of the metal oxide include a crystalline fine particle and a composite fine particle.

Examples of the antistatic agent include: alkylphosphate anionic surfactants such as ELECTROSTRIPPER A (trade name, manufactured by Kao Corp.) and ELENON No. 19 (trade name, manufactured by Dai-ichi Kogyo Seiyaku Co., Ltd.); betaine amphoteric surfactants such as AMOGEN K (trade name, manufactured by Dai-ichi Kogyo Seiyaku Co., Ltd.); polyoxyethylene fatty acid ester nonionic surfactants such as Nissan NONION L (trade name, manufactured by Nippon Oil and Fat Co., Ltd.); polyoxyethylene alkyl ether nonionic surfactants such as EMULGEN 106, 120, 147, 420, 220, 905 and 910 (trade name, manufactured by Kao Corp) and Nissan NONION E (trade name, manufactured by Nippon Oil and Fat Co., Ltd.); and other nonionic surfactants such as polyoxyethylenealkylphenol ether surfactants, polyhydric alcohol fatty acid ester surfactants, polyoxyethylenesorbitan fatty acid ester surfactants and polyoxyethylenealkylamine surfactants. The surfactants may be used singly or in a combination of two kinds or more thereof.

The electroconductive layer can be formed by appropriately selecting from configurations that use known electroconductive materials. Preferable examples of the electroconductive materials include, from the viewpoint of obtaining stable electroconductive effect without being disturbed by a humidity environment, $ZnO$, $TiO_2$, $SnO_2$, $Al_2O_3$, $In_2O_3$, $SiO_2$, $MgO$, $BaO$ and $MoO_3$. These may be used singly or in a combination of two kinds or more thereof.

The volume resistance of the metal oxide or the electroconductive material is preferably $10^7$ $\Omega \cdot cm$ or less and more preferably $10^5$ $\Omega \cdot cm$ or less. The particle diameter of the metal oxide or the electroconductive material is preferably in the range of 0.01 to 0.7 µm and more preferably in the range of 0.02 to 0.5 µm.

The electroconductive layer may include a binder, and examples thereof include gelatin, a cellulose ester such as cellulose nitrate, cellulose triacetate, cellulose diacetate, cellulose acetate butyrate or cellulose acetate propionate, a homopolymer or copolymer including vinylidene chloride, vinyl chloride, styrene, acrylonitrile, vinyl acetate, an alkyl acrylate having 1 to 4 carbon atoms, or vinyl pyrrolidone, soluble polyester, polycarbonate and soluble polyamide.

Other than the above, a photosensitive transfer material may be provided with, as another layer, a protective film or the like.

The protective film has a function of protecting the photosensitive resin layer from dirt, damage and the like during storage and may be constituted of a material same as or similar to the material of the temporary support. A film that can readily be peeled from the photosensitive resin layer may be used as the protective film. Examples thereof preferably include silicone paper, a polyolefin sheet and a polytetrafluoroethylene sheet. Among these, a polyethylene sheet or film or a polypropylene sheet or film is preferred. The thickness of the protective film is preferably in or around the range of 5 to 100 µm and more preferably in the range of 10 to 30 µm.

The photosensitive transfer material can be preferably prepared in the following manner: a solution (thermoplastic resin layer-coating solution) in which a thermoplastic organic polymer (thermoplastic resin) and an additive are dissolved is applied to a temporary support and dried to provide a thermoplastic resin layer; after that, a preparation solution (intermediate layer coating solution) prepared by adding a resin or an additive to a solvent that does not dissolve the thermoplastic resin layer is applied to the thermoplastic resin layer and dried to form an intermediate layer; and a photosensitive resin composition (the resin composition for recording material, which is provided with photosensitivity) that has been prepared as described above by using a solvent that does not dissolve the intermediate layer is applied to the intermediate layer and dried to form a photosensitive resin layer.

Other than the above process, the photosensitive transfer material may also be prepared in the following manner: a first sheet having a thermoplastic resin layer and an intermediate layer provided in this order on a temporary support, and a second sheet having a photosensitive resin layer disposed on a protective film are prepared; and these sheets are adhered such that the surface of the intermediate layer of the first sheet and the surface of the photosensitive resin layer come into contact with each other. Furthermore, the photosensitive transfer material may alternatively be prepared in the following manner: a first sheet having a thermoplastic resin layer disposed on a temporary support, and a second sheet having a photosensitive resin layer and an intermediate layer disposed in this order on a protective film are prepared; and these sheets are adhered so that the surface of the intermediate layer of the first sheet and the surface of the thermoplastic resin layer of the second sheet come into contact with each other.

—Preparation of Photosensitive Transfer Material—

The photosensitive transfer material can be prepared by: applying to a temporary support a solution of a resin composition for a recording material, which preferably has photosensitivity, with a coating machine such as a spinner, a whiler, a roller coater, a curtain coater, a knife coater, a wire bar coater, an extruder or a slit coater; and drying the solution to form a photosensitive resin layer. Furthermore, other than the photosensitive resin layer, another layer such as a thermoplastic resin layer or an intermediate layer can also be formed in a similar manner.

—Method of Forming Light-Shielding Film—

In the next place, a process of forming a light-shielding film in the invention will be described.

Hereinafter, with a black matrix as an example of a light-shielding film in the invention, an example of a pattern-forming method of the black matrix will be described.

A first method is as follows. First, a photosensitive composition that includes a resin or a precursor thereof and metal particles in the invention is applied to a substrate to form a photosensitive resin layer as a black material. Thereafter, the photosensitive resin layer is exposed to light and developed so as to remove the photosensitive resin layer in a portion other than a black-matrix-forming pattern, and so as to form a pattern that serves as the black matrix. Furthermore, a layer having the same composition as that of the intermediate layer may be formed on the photosensitive resin layer to form a protective layer. For the coating, it is preferable to use a slit-like nozzle or a slit coater.

A second method is as follows. First, a non-photosensitive composition that includes a resin or a precursor thereof and metal particles in the invention is applied to a substrate to form a coated film including fine particles in the invention as a black material. Thereafter, a photosensitive resist solution is applied to the coated film to form a resist layer, and the resist layer is exposed to light and developed, so that a pattern is formed in the resist layer. After that, a non-pattern portion (a portion that does not form a black matrix) is dissolved in accordance with this pattern, so that the coated film is patterned. Finally, the resist layer is removed to form a black matrix.

A third method is as follows. In advance, a coated layer is formed on a non-pattern portion (a portion that does not form a black matrix) on a substrate, and thereon, a non-photosensitive composition that includes a resin or a precursor thereof and metal particles in the invention is applied to form a light-shielding film including fine particles in the invention as a black material. In the next place, the coated film formed in advance is removed together with the laminated light-shielding film to form a black matrix.

A fourth method is based on a transfer process that uses the above-mentioned photosensitive transfer material. That is, in the fourth method, at least a photosensitive resin layer is transferred onto a substrate (that is, a final support) by use of the above-mentioned photosensitive transfer material, and at least the photosensitive resin layer, which has been transferred onto the substrate, is exposed patternwise to light. The exposed photosensitive resin layer is developed to remove an unnecessary portion (a portion where a black matrix—a light-shielding film—is not formed), and, after development, at least the developed photosensitive resin layer is heated to conduct a baking treatment.

Specifically, the photosensitive transfer material that has a photosensitive resin layer including the metal particles in the invention is disposed and adhered onto a light-transmitting substrate so that the photosensitive resin layer of the photosensitive transfer material come into contact with the light-transmitting substrate, followed by peeling the temporary support from the laminate of the photosensitive transfer material and the light-transmitting substrate. After that, the photosensitive resin layer is exposed to light through a photomask for forming a light-shielding film and developed to form a pattern, thereby forming a black matrix. The method does not necessitate a troublesome process, and the cost thereof is low.

Thus, a substrate having a light-shielding film—a substrate having a black matrix (light-shielding film) including a resin or a precursor thereof and metal particles of the invention—can be obtained. A color filter can be prepared by disposing colored pixels of red (R), green (G) and blue (B) (colored layer described below) on the substrate. Specifically, a color filter can be prepared by a known method such as a method including forming a photosensitive resin layer colored in R, G or B (colored layer) on a substrate having a light-shielding film, exposing the photosensitive resin layer to light and developing the photosensitive resin layer, and repeating the above operations for the number of times corresponding to the number of the desired colors.

Examples of a method of forming a colored photosensitive resin layer on a substrate having a light-shielding film include, in particular, (a) a method (coating method) where the resin composition for a recording material is applied by a known coating method, and (b) a method (transfer method) where the photosensitive resin transfer material is adhered by use of a laminator or the like to accomplish transfer.

(a) Coating Method

The composition may be applied by using a slit-like nozzle or a slit coater. Specific preferable examples of the slit-like nozzle and slit coater are described above.

(b) Transfer Method

In the transfer method, a photosensitive transfer material is used, and a photosensitive resin layer formed in a film shape is adhered to a surface of a substrate hang a light-shielding film through pressure bonding or pressure bonding under heating with a heated and/or pressurized roller or planar plates followed by peeling and transferring. Specifically, laminators and lamination methods described in JP-A Nos. 07-110575, 11-77942, 2000-334936 and 2002-148794 may be cited. Among these, it is preferable to use the method described in JP-A No. 07-110575 from the viewpoint of reducing foreign substances.

As the substrate on which the light-shielding film in the invention is formed, a transparent substrate is preferred. Examples thereof include known glass sheets such as a soda glass sheet having a silicon oxide film on a surface thereof, low expansion glass, alkali-free glass or a quartz glass sheet, or plastic films. Furthermore, the substrate may be preliminarily treated by a coupling treatment, so as to improve the adhesiveness with the resin composition for a recording material or with the photosensitive resin layer of the photosensitive transfer material. As the coupling process, known processes such as processes described in paragraphs [0027] to [0032] of JP-A No. 2000-191926 and paragraphs to [0019] of JP-A No. 2000-340696 are preferably used.

Furthermore, when a photosensitive resin layer is thus formed and a light-shielding film or a colored layer is disposed thereon, an oxygen impermeable film may be further disposed on the photosensitive resin layer, whereby the exposure sensitivity can be increased. The oxygen impermeable Mm may have a configuration similar to that of the intermediate layer of the photosensitive transfer material.

When a photosensitive resin layer is formed and a light-shielding film or a colored layer is disposed thereon, the colored photosensitive resin layer is exposed to light and developed as described below.

A certain mask is placed above a photosensitive resin layer formed on a substrate, followed by exposure to light from above the mask (from the side of the mask that does not face the photosensitive resin layer) through the mask, and optionally through a thermoplastic resin layer and an intermediate layer (exposure step). After completion of the exposure, a development treatment is carried out using a developer (development step).

A light source used in the exposure process may be appropriately selected and used, as far as it can radiate light in a wavelength region capable of curing the photosensitive resin layer (such as 365 nm, 405 nm). Specific examples thereof include an ultrahigh pressure mercury lamp, a high pressure mercury lamp and a metal halide lamp. An exposure amount is normally in or around the range of 5 to 200 mJ/cm$^2$ and preferably in or around the range of 10 to 100 mJ/cm$^2$.

A developer is not particularly restricted and a known developer such as that described in JP-A No. 5-72724 may be used. As the developer, one that shows a developing activity of dissolving the photosensitive resin layer is preferred. For instance, a developer that includes a compound having pKa in the range of 7 to 13 at a concentration in the range of 0.05 to 5 mol/l is preferred, and a small amount of an organic solvent that is miscible with water may be further added. Examples of the organic solvent which is miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ∈-caprolactone, γ-butyrolactone, dimethylformamide, dimethyl acetamide, hexamethyl phosphoramide, ethyl lactate, methyl lactate, ∈-caprolactam and N-methylpyrrolidone. The concentration of the organic solvent is preferably in the range of 0.1 to 30% by mass.

To the developer, a known surfactant may be fixer added in a concentration of preferably in the range of 0.01 to 10% by mass.

The development may be carried out according to a method such as paddle development, shower development, shower-and-spin development or dipping development. Here, the shower development will be described.

When the shower development is applied, a developer is sprayed by showering it to an exposed photosensitive resin layer, whereby an uncured portion can be removed. It is preferred that, prior to the development, an alkaline solution having a lower power to dissolve the photosensitive resin layer is sprayed by showering or the like, to remove the thermoplastic resin layer, the intermediate layer, or the like. Furthermore, after the development, a cleaning agent or the like is preferably sprayed by showering while rubbing with a brush to remove the development residue.

The temperature of the developer is preferably in the range of 20 to 40° C., and the pH thereof is preferably in the range of 8 to 13.

In the next place, a method of forming a light-shielding film in the invention will be described in more detail by showing a specific example where a black matrix is formed by a transfer method. However, the invention is not restricted thereto.

The black matrix is preferably produced through a transfer step where a photosensitive resin layer is transferred onto a substrate by use of the photosensitive transfer material, an exposure step where the photosensitive resin layer, which has been transferred onto the substrate, is at least once exposed to light, and a development step where the exposed photosensitive resin layer is at least once developed. Furthermore, a baking step where the developed photosensitive resin layer is at least once heat-treated may be conducted. Specifics thereof are as described below.

i) Substrate Cleaning

First, an alkali-free glass substrate (hereinafter, simply referred to as a "substrate") is prepared and cleaned, before the transfer step, to remove dirt on a substrate surface. For instance, the substrate is cleaned by spraying, by shower, a glass cleaner solution (such as T-SD1, T-SD2 or T-SD3 (trade name, manufactured by FUJIFILM Corporation)), which has been conditioned at 25° C., for 20 sec with a nylon-haired rotary brush, followed by cleaning by pure water shower.

ii) Silane Coupling Treatment

In order to enhance the adhesion of the photosensitive resin layer by the lamination in the following transfer step, it is preferable to conduct a silane coupling treatment. Silane coupling agents having a functional group capable of interacting with the photosensitive resin are preferable. For instance, a silane coupling solution (0.3% by mass aqueous solution of N-β-(aminoethyl)-γ-aminopropyl trimethoxysilane (trade name: KBM-603, manufactured by Shin-Etsu Chemical Co., Ltd.)) is sprayed for 20 sec by shower, followed by cleaning with pure water shower. Thereafter reaction is conducted by heating.

A heating bath may be used. However; the reaction may be conducted by a preliminary heating by a laminator.

iii) Lamination (Transfer Step)

The substrate after the cleaning and silane coupling treatment is heated by a substrate preheater at 100° C. for 2 min, and is next conveyed to a laminator. In this way, uniform lamination can be carried out. Then, a protective film is peeled off the photosensitive transfer material, and the photosensitive transfer material is laminated to the substrate, which has been heated to 100° C., with a laminator under the conditions of a rubber roller temperature of 130° C., a line pressure of 100 N/cm and a travel speed of 2.2 m/min. The rubber roller temperature is preferably higher than 100° C. but lower than 150° C. When the temperature is 150° C. or more, wrinkles occur in the transfer material, and when the temperature is 100° C. or less, the adhesiveness of the photosensitive resin layer may be weak.

iv) Exposure (Exposure Step)

After the temporary support is peeled off the laminate, a proximity-type exposure unit provided with an ultrahigh pressure mercury lamp is used for patternwise expose. When the size of the substrate is equal to or more than 50 cm, it is preferable to conduct exposure with both of the substrate and a mask (a quartz exposure mask having an image pattern) being upright from the viewpoint of avoiding sagging of a mask. Although a superior resolution may be obtained as a distance between the surface of the exposure mask and the surface of the photosensitive resin layer is small, foreign matters tend to easily adhere. Accordingly, the distance is desirably in the range of 100 to 300 μm. The amount of the exposure is desirably in the range of 10 to 80 mJ/cm$^2$.

v) Removal of Thermoplastic Resin Layer and Intermediate Layer

After the exposure step, a triethanolamine developer T-PD1 (trade name, including 2.5% of triethanolamine, a nonionic surfactant, and a polypropylene defoaming agent, manufactured by FUJIFILM Corporation) is used to develop and remove the thermoplastic resin layer and the intermediate layer. At this time, ideally, it is preferred that the conditions are set so that the photosensitive polymer layer is not developed at all. For instance, the developer is desirably supplied by shower at 30° C. for 50 sec under a flat nozzle pressure of 0.04 MPa.

vi) Development of Photosensitive Resin Layer (Development Step)

Thereafter, the photosensitive resin layer is alkali developed to thereby form a pattern that forms a black matrix. For instance, a sodium carbonate developer T-CD1 (trade name, manufactured by FUJIFILM Corporation) is used. The development may be carried out by a shower under a condition of a conical nozzle pressure of 0.15 MPa at 35° C. for 35 sec. Examples of the developer include a KOH developer and a TMAH developer.

vii) Removal of Residues

Subsequently, for instance, a cleaning agent T-SD1 (trade name, manufactured by FUJIFILM Corporation) or T-SD2 and T-SD3 (trade name, manufactured by FUJIFILM Corporation) are used to remove a residual component of the photosensitive resin layer in an unexposed portion. The residues are removed by a shower under a condition of a conical nozzle pressure of 0.02 MPa at 33° C. for 20 sec with a rotation of a nylon-haired rotary brush.

viii) Post-Exposure

Subsequently, the substrate is further subjected to post-exposure from a side at which the pattern is formed, using an ultrahigh pressure mercury lamp at about 1000 mJ/cm$^2$. Thereby, a polymerization effect at the later baking step is enhanced. Further, the cross-sectional shape of the baked black matrix can be adjusted by the post exposure amount.

The post-exposure may be applied from the both sides of the substrate, and the exposure energy may be selected within the range of 100 to 10000 mJ/cm$^2$.

ix) Baking Treatment (Baking Step)

A baking treatment may be carried out, so as to allow monomers or oligomers to react to form a hard film. The baking is desirably carried out under conditions of 200 to 240° C. and about 10 min. to about 20 min. When, after the black matrix is formed, colored pixels of RGB are her formed in a manner similar to what is described above, it is desirable that the baking is carried out under the above-mentioned conditions during the formation of the black matrix and a further heat treatment is carried out at 200 to 240° C. for 30 to 180 minutes after the formation of the black matrix and the colored pixels. The temperature and time are desirably set at a relatively high temperature and a relatively short time so as to reduce occurrence of discoloration due to the baking (such as yellowing) and so as to avoid decrease in the production Takt.

The light-shielding film (including black matrix) in the invention can be, as will be described below, suitably applied to a liquid crystal display device constituted from known members.

<Substrate Having Light-Shielding Film>

The substrate having a light-shielding film includes a substrate and the light-shielding film in the invention disposed on the substrate. Specifically, the substrate having a light-shielding film is prepared by patterning a layer (including a photosensitive resin layer formed by the transfer method) that is formed as described above on a light-transmitting substrate by using a composition (preferably the resin composition for a recording material) that includes at least one of a resin and a precursor thereof and also includes metal particles in the invention.

For producing a color filter, the substrate having a light-shielding film can be used preferably as a black matrix substrate having a black matrix (light-shielding film).

When the black matrix substrate is formed, the film thickness of the light-shielding film is preferably in the range of 0.2 to 2.0 µm and more preferably in the range of 0.2 to 0.9 µm.

<Colored Layer>

The colored layer in the invention is a layer which is provided on a substrate and which includes the light-shielding film and a group of pixels composed of plural pixels having two or more colors.

As a method of forming the colored layer, methods similar to the coating method and the transfer method that are used to form the light-shielding film may be used. Furthermore, as a coloring composition that forms a colored layer, it is preferable to use a composition obtained by incorporating a coloring agent into a photosensitive composition that can be used for forming the above-described light-shielding film or the after-mentioned photospacer.

Examples of the coloring agent include a dye and a pigment. Preferable kinds and sizes of the pigment may be appropriately selected in accordance with the description of, for instance, JP-A No. 11-149008. When a coloring agent such as the pigment is contained, a colored pixel can be formed. Examples of pigments that can be used include extender pigments and coloring pigments. The extender pigment, without particular restriction, may be appropriately selected in accordance with the purpose. For instance, the extender pigments described in paragraphs [0035] to [0041] of JP-A No. 2003-302639 may be preferably cited. As the coloring pigments, pigments described in paragraph [0043] of JP-A No. 2003-302639 may be suitably cited.

Furthermore, the pixel group that constitutes the colored layer may include pixels of two colors showing colors different from each other and may include pixels of three colors or four colors or more. For instance, in the case of three colors, the pixel group is composed of pixels of three hues of red (R), green (G) and blue (B). When a group of pixels of three colors of RGB are disposed, a mosaic arrangement, a triangle arrangement, or the like is preferred. When a group of pixels of four or more colors are disposed, any arrangement may be adopted. A substrate provided with a colored layer (color filter) may be produced by foxing a colored film after a pixel group of two or more colors is formed, or alternatively by forming a pixel group after a colored film is formed. The ROB pixels may be formed with reference to JP-A No. 2004-347831 and the like.

<Photospacer>

The photospacer in the invention is a spacer that regulates cell thickness between the substrates.

Furthermore, the photospacer is formed by use of a photospacer-forming photosensitive resin composition or a photospacer-forming photosensitive resin layer formed from the photosensitive resin composition. Thus photospacer thus formed shows a high (preferably 70% or more) deformation recovery rate upon plastic deformation, and has sufficient mechanical characteristics. Accordingly, the photospacer is effective to maintain a uniform cell thickness of a liquid crystal cell. As a result, the photospacer can be preferably used in liquid crystal display devices, in which fluctuations in cell thickness of the liquid crystal cell are likely to cause display unevenness.

The deformation recovery rate of the photospacer in the invention is preferably 70% or more, more preferably 80% or more and still more preferably 85% or more, in terms of a deformation recovery rate in the following loading and unloading test: a photospacer of 17 µmφ is tested with a conical indenter of 50 µmφ under conditions of a loading speed of 0.145 gf/sec, a maximum load of 78 mN, a holding time of 5 sec and a measurement temperature of 23° C. When the deformation recovery rate is within the above-mentioned range, the photospacer withstands the compression strength from outside and the plastic deformation is prevented during the panel formation, whereby a liquid crystal layer having a desired thickness can be obtained. As a result, the display unevenness due to the thickness fluctuations is eliminated, and display of a high quality image can be realized. The photospacer is preferably disposed on the light-shielding film. When the photospacer is disposed on the light-shielding film, the light leakage caused by the photospacer can be suppressed and thereby the display quality is improved. Furthermore, the photospacer may be disposed at a portion where the light-shielding film and the colored layer overlap. In this case, even when a photospacer with a small height is used, a sufficient cell gap can be maintained, which is preferable. Furthermore, since the light-shielding film and the photospacer in the invention are small in the film thickness fluctuations, the thickness variation of the cell thickness determined by the light-shielding film and the photospacer can be made small and thereby the display quality is improved.

In particular, when a cell is configured to have a small cell thickness of 2 to 4 µm, display unevenness in the image displayed by the liquid crystal display element can effectively be prevented.

The photospacer in the invention can be prepared according to a production method similar to that described in the section of the light-shielding film.

When the photospacer-forming photosensitive resin layer is formed by coating, its layer thickness is preferably in the range of 0.5 to 10.0 µm and more preferably in the range of 1 to 6 µm. When the layer thickness is within the above range, at the coating during production, pinholes is prevented from occurring, and an unexposed portion can be developed and removed without taking a long time.

—Photospacer-Forming Photosensitive Resin Composition—

In the next place, a photospacer-forming photosensitive resin composition will be described.

A photospacer-forming photosensitive resin composition in the invention preferably includes a photosensitive alkali-developable resin composition. In particular, a photospacer-forming photosensitive resin composition includes at least (A) a polymer, (B) a polymerizable monomer and (C) a photopolymerization initiator, and, as needs arise, may further include (D) other component(s) such as a coloring agent or a surfactant.

(A) Polymer

A polymer has a function as a binder component for forming a photospacer, and the polymer itself preferably has a crosslinking group. The polymer may be any one of a homopolymer of a monomer and a copolymer made of plural monomers, which are appropriately selected in accordance with the purpose. Specific examples of copolymers preferable as the polymer include the "resin" described above, copolymers described m paragraphs [0030] to [0054] of JP-A No. 2003-131379 and resins described in paragraphs [0011] to [0037] of J-A No. 2003-207787. However, the polymers in the invention are not restricted thereto.

The amount of the polymer in the photospacer-forming photosensitive resin composition (or photosensitive resin layer) is preferably in the range of 30 to 70% by mass and more preferably in the range of 40 to 50% by mass with respect to the solid content of the composition or the layer.

(B) Polymerizable Monomer

The polymerizable monomer preferably has a crosslinking group. In particular, a polymerizable monomer that has at least one addition-polymerizable ethylenically unsaturated group may be, without particular restriction, appropriately selected in accordance with the purpose. As the polymerizable monomer, those exemplified above can be used and examples thereof include an ester compound, an amide compound and other compounds. Specifically, monomers described in the section of "Photopolymerizable Monomer" and in paragraphs [0055] to [0063] of JP-A No. 2003-131379 are cited. However, in the invention, the polymerizable monomers are not restricted thereto.

The polymerizable monomers may be used singly or in a combination of two kinds or more thereof.

The amount of the polymerizable monomer in the photospacer-forming photosensitive resin composition (or photosensitive resin layer) is, with respect to the total solid content of the composition or layer, preferably in the range of 10 to 60% by mass and more preferably in the range of 20 to 50% by mass.

In the invention, the ratio (M/B) of the amount M (% by mass) of the polymerizable monomer to the amount B (% by mass) of the polymer in the photospacer-forming photosensitive resin composition is preferably in the range of 0.6 to 1.5 and more preferably in the range of 0.7 to 1.0.

(C) Photopolymerization Initiator

The photopolymerization initiator preferably includes at least one kind of component that has a molecular absorption coefficient of about 50 or more in a wavelength region of from about 300 to about 500 nm. Examples thereof include the "photopolymerization initiators" described above, and aromatic ketones, rofin dimmers, benzoin, benzoin ethers, polyhalogens, halogenated hydrocarbon derivatives, ketone compounds, ketoxime compounds, organic peroxides, thio-compounds, hexaaryl biimidazole, aromatic onium salts and ketoxime ethers, which are described in JP-A Nos. 2-48664, 1-152449 and 2-153353.

Among these, a combination of 4,4'-bis(diethylamino)benzophenone and a 2-(o-chlorophenyl)-4,5-diphenylimidazole dimmer, 4-[p-N,N'-di(ethoxycarbonylmethyl)-2,6-di (trichloromethyl)-s-triazine], 2,4-bis-(trichloromethyl)-6-[4-(N,N'-diethoxycarbonylmethylamino)-3-bromophenyl]-s-triazine and the like are preferred.

The photopolymerization initiators may be used singly or in a combination of two kinds or more thereof.

The amount of the photopolymerization initiator in the photospacer-forming photosensitive resin composition (or photosensitive resin layer) is, with respect to the amount of the crosslinking groups in the composition or the layer, preferably in the range of 0.6 to 2.82 mole/mole and more preferably in the range of 1.0 to 2.0 mole/mole. When the amount is within the range, the heights of the prepared photospacers are maintained uniform.

(D) Other Components

In addition to the polymers, polymerizable monomers and photopolymerization initiators, the photospacer-forming photosensitive resin composition (or photosensitive resin layer) may include, as needs arise, an additive such as a coloring agent, a surfactant, a solvent, a thermal polymerization inhibitor or a UV absorber. As the coloring agent, those described above may be used.

<Liquid Crystal Layer>

Examples of the liquid crystal that can be used in the liquid crystal layer in the invention include a nematic liquid crystal, a cholesteric liquid crystal, a smectic liquid crystal and a ferroelectric liquid crystal. The thickness of the liquid crystal layer, that is, the "cell thickness" is preferably in the range of 1.5 to 4 µm and more preferably in the range of 2.0 to 3.0 µm, from the viewpoint of obtaining a high response speed and a high contrast ratio.

<Substrate for Liquid Crystal Display>

A substrate for liquid crystal display of the invention includes at least: at least two substrates, a liquid crystal layer disposed between the substrates, an electrode for applying an electric field to the liquid crystal layer, a photospacer in the invention for regulating the cell thickness between the substrates, a light-shielding film of the invention and a colored layer. At least a part of the spacer is formed at a portion where the light-shielding film and the colored layer overlap. As needs arise, a transparent electroconductive layer (transparent electrode) such as ITO or a liquid crystal orientation film such as polyimide may be present between the light-shielding film and the photospacer.

When the photospacer is disposed at a portion where the light-shielding film and the colored layer overlap, a substrate for liquid crystal display of the invention can be prepared by: laminating a photospacer-forming photosensitive resin layer of a photosensitive transfer material on a substrate surface so as to cover a portion where the light-shielding film and the colored layer, which have been disposed in advance on the substrate, overlap, followed by peeling and transferring to form a photospacer-forming photosensitive resin layer; and exposing photospacer-forming photosensitive resin layer to light, developing and heating the photospacer-forming photosensitive resin layer to form a photospacer.

<Liquid Crystal Display Element>

The liquid crystal device element of the invention includes a substrate for liquid crystal display of the invention. As one example of the liquid crystal display elements, an element that has a liquid crystal driving unit disposed on the substrates for a liquid crystal display element of the invention in which one of the substrates is light transmitting, may be mentioned.

In this case, the substrate for liquid crystal display of the invention may be constituted as a color filter substrate where the liquid crystal layer has a group of plural RGB pixels and the respective pixels constituting the pixel group include pixels that are separated from each other by a light-shielding film. The color filter substrate is provided with a light-shielding film and, thereon, a photospacer excellent in the height uniformity. Accordingly, in the liquid crystal display element having the color filter substrate, cell gap unevenness (cell thickness variation) between the color filter substrate and the counter substrate is prevented from occurring, resulting in effective prevention of display unevenness such as color unevenness. For this reason, the produced liquid crystal display element can display a clear image.

Another embodiment of the liquid crystal display element of the invention has a constitution in which a substrate for liquid crystal display including a pair of substrates is provided with a liquid crystal driving unit at least one of the pair of substrates is light-transmitting, the liquid crystal driving unit has an active element (such as a TFT), and the distance between the pair of substrates is regulated to a predetermined width by a photospacer uniform in height and excellent in deformation recovery rate. In this case as well, the substrate for liquid crystal display of the invention is constituted as a color filter substrate having a group of plural RGB pixels, and the respective pixels constituting the pixel group are separated from each other by the black matrix.

<Liquid Crystal Display Device>

The liquid crystal display device of the invention includes the liquid crystal display element of the invention. That is, the liquid crystal display device has a configuration in which the gap between a pair of substrates that are oppositely disposed so as to face each other is regulated, as mentioned above, to a predetermined width by the photospacer prepared according to a production method of the photospacer of the invention, and a liquid crystal material is filled in the regulated gap (the filled portion is called a liquid crystal layer). Thereby, the thickness (cell thickness) of the liquid crystal layer is maintained to a desired uniform thickness.

Examples of liquid crystal display modes in the liquid crystal display device include various modes such as STN, TN, GH, ECB, ferroelectric liquid crystal, antiferroelectric liquid crystal, VA, IPS, OCB, ASM and others. Among these, in the liquid crystal display device of the invention, a display mode in which fluctuations of the cell thickness of the liquid crystal cell tend to cause display unevenness is desirable from the viewpoint of most effectively exerting advantages of the invention, and the VA display mode, IPS mode and OCB mode, with a cell thickness in the range of 2 to 4 μm, are preferable.

Examples of fundamental constitution embodiments of a liquid crystal display device of the invention include (a) a configuration in which a driving-side substrate on which driving elements such as thin film transistors CUT) and pixel electrodes (electroconductive layer) are arranged and formed and a counter substrate provided with counter electrodes (electroconductive layer) are oppositely disposed with photospacer interposed therebetween, and a liquid crystal material is filled in the gap therebetween, and (b) a configuration in which a driving substrate and a counter substrate provided with a counter electrode (electroconductive layer) are oppositely disposed with photospacer interposed therebetween, and a liquid crystal material is filled in the gap therebetween.

The liquid crystal display device of the invention can preferably be applied to various kinds of liquid crystal display apparatuses.

Liquid crystal display devices are described in, for instance, "Next-Generation Liquid Crystal Display Technology (edited by Tatsuo Uchida, and published by Kogyo Chosakai Publishing Inc. in 1994)". The liquid crystal display device of the invention is not particularly restricted except that it has a liquid crystal display element of the invention, and may be a liquid crystal display device of any of various modes described in, for instance, "Next-Generation Liquid Crystal Display Technology". Among them, in particular, the liquid crystal display device of the invention can effective form a color TFT liquid crystal display device. Color TFT liquid crystal display devices are described in, for instance, "Color TFT Liquid Crystal Displays (published by Kyoritsu Shuppan Co., Ltd. in 1996)."

The liquid crystal display device of the invention may have a general constitution using various members such as an electrode substrate, a polarization film, a retardation film, a backlight, a spacer, a viewing angle compensation film, an anti-reflection film, a light diffusing film and an anti-glare film, except that it has the liquid crystal display element of the invention. These members are described in, for instance, "Market of Liquid Crystal Display-related Materials and Chemicals in 1994 (written by Kentaro Shima, published by CMC Publishing in 1994)", and "Current Status and Future Prospect of Liquid Crystal-related Market in 2003 (2nd vol.) (written by Ryokichi Omote, published by Fuji Chimera Research Institute, Inc. in 2003)."

EXAMPLES

Hereinafter the invention will be described with reference to examples. However, it should be understood that the invention is not restricted to Examples. In Examples, "part" and "%" are based on mass. Examples will be described in detail with a focus on a combination of a transfer method and a LED backlight. However, in the invention, a coating method that uses a slit coater may be carried out and a backlight may be constituted with a cold cathode tube.

Example 1

Coating Method

<Preparation of Dispersion Liquid (Dispersion Liquid A1) of Metal Particles Having Silver-Tin Alloy Portion>

In 1000 ml of pure water, 23.1 g of silver (I) acetate, 65.1 g of tin (II) acetate, 54 g of gluconic acid, 45 g of sodium pyrophosphate, 2 g of polyethylene glycol (molecular weight: 3,000) and 5 g of E735 (trade name, manufactured by ISB Japan, vinyl pyrrolidone/vinyl acetate copolymer) were dissolved to obtain Solution 1.

Separately, 36.1 g of hydroxy acetone was dissolved in 500 ml of pure water to obtain Solution 2.

While the above-obtained Solution 1 is maintained at 25° C. under vigorous agitation, Solution 2 was added thereto over 2 min, followed by continuing mild agitation for 6 hr. The mixed solution turned black, and metal particles having a silver-tin alloy portion (hereinafter, in some cases, referred to as "silver-tin alloy portion-containing particles") were obtained. Then, the solution was centrifuged to precipitate silver-tin alloy portion-containing particles. In the centrifugation, the solution was divided into aliquots of 150 ml, followed by centrifugation at a number of rotations of 2000 rpm for 30 min by use of a table-top centrifugal separator (trade name: H-103n, manufactured by Kokusan Co. Ltd.). Then, the supernatant was discarded to reduce the total amount of the solution to 150 ml, and 1350 ml of pure water was added to the solution, followed by agitating for 15 minutes to disperse the silver-tin alloy portion-containing particles again. The operation was repeated twice to remove soluble materials in the aqueous phase.

Thereafter, the resultant solution was further centrifuged to again precipitate the silver-tin alloy portion-containing particles. The centrifugal separation was carried out under the same condition as that mentioned above. After the centrifugal separation, similarly to the above, the supernatant was discarded to reduce the total amount of the solution to 150 ml, and 850 ml of pure water and 500 ml of acetone were added to the solution, followed by further agitating for 15 minutes to again disperse the silver-tin alloy portion-containing particles.

Thereafter, the centrifugal separation was carried out again in a manner similar to that described above, so as to precipitate silver-tin alloy portion-containing particles. Then, the supernatant was discarded to reduce the amount of the solution to 150 ml, and 150 ml of pure water and 1200 ml of acetone were added to the solution, followed by agitating for further 15 minutes to disperse the silver-tin alloy portion-containing particles again. Then, the centrifugal separation was again carried out Conditions of the centrifugal separation at this time were the same as that described above, except that the time was extended to 90 min. The supernatant was discarded to reduce a total amount of the solution to 70 ml and 30 ml of acetone was added thereto. The solution was dispersed for 6 hr by use of an Eiger mill M-50 model (trade name, manufactured by EIGER Japan K. K., media: 130 g of zirconia ball having a diameter of 0.65 mm), to thereby obtain a dispersion liquid (Dispersion liquid A1) of silver-tin alloy portion-containing particles.

The silver-tin alloy portion-containing particles were confirmed, by X-ray scattering, to be a composite of an AgSn alloy (2θ=39.5°) and Sn metal (2θ=30.5°). Here, numerical numbers in parentheses, respectively, show scattering angles of (III) face. The fine particles dispersion liquid was observed by use of a transmission electron microscope and a dispersion average particle diameter thereof was found to be about 40 nm in terms of the number average particle size.

The number average particle size was measured as described below using a photograph obtained from a transmission electron microscope JEM-2010 (trade name, manufactured by JEOL Ltd.).

100 particles were selected, and the diameter of a circle having the same area as that of each particle image was assumed to be the diameter of the particle. The average value of the particle diameters of the 100 particles was taken as a number average particle size. At this time, a photograph that was taken at a magnification of 100,000 times under an accelerating voltage of 200 kV was used. Results are shown in Table 2 below.

<Preparation of Photosensitive Coating Solution for Light-Shielding Film>

The following composition was mixed, to thereby prepare a photosensitive coating solution for a light-shielding film.

[Composition]

| | |
|---|---|
| The metal particles having a silver-tin alloy portion (Dispersion A1) | 50.00 parts |
| Propylene glycol monomethyl ether acetate (trade name: MMPGAC, manufactured by Daicel Chemical Industries, Ltd. (the same material is used hereinafter)) | 28.8 parts |

-continued

| | |
|---|---|
| Methyl ethyl ketone | 37.6 parts |
| Surfactant 1 having a composition described below | 0.2 parts |
| Hydroquinone monomethyl ether | 0.001 parts |
| Copolymer of styrene/acrylic acid (molar ratio = 56/44, weight average molecular weight: 30,000) | 9.6 parts |
| Dipentaerythritol hexaacrylate (trade name: KAYARAD DPHA, manufactured by Nippon Kayaku Co., Ltd.) | 9.6 parts |
| Bis[4-[N-[4-(4,6-bistrichloromethyl-s-triazine-2-yl)phenyl]carbamoyl]phenyl]sebacate | 0.5 parts |

—Composition of Surfactant 1—

| | |
|---|---|
| Structure 1 shown below | 30 parts |
| Methyl ethyl ketone | 70 parts |

Structure 1

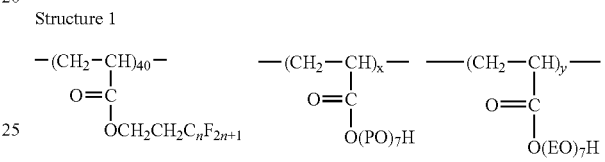

(n = 6, x = 55, y = 5, Mw = 33940, Mw/Mn = 2.55, PO: propylene oxide, EO: ethylene oxide)

<Preparation of Coating Solution for Protective Layer>

The following composition was mixed, to thereby prepare a coating solution for a protective layer.

| | |
|---|---|
| Polyvinyl alcohol (trade name: PVA-205, manufactured by Kuraray Co., Ltd.) | 3.0 parts |
| Polyvinyl pyrrolidone (trade name: PVP-K30, manufactured by ISP Japan) | 1.3 parts |
| Distilled water | 50.7 parts |
| Methyl alcohol | 45.0 parts |

<Preparation of Substrate Having Light-Shielding Film by Coating>

(1) On a glass substrate, the above-obtained photosensitive coating solution for a light-shielding film was applied by use of a glass substrate coater having a slit-like nozzle (trade name: MH-1600, manufactured by FAS Asia Co., Ltd.), followed by drying at 100° C. for 5 minutes, to thereby form a photosensitive layer (coating step). Subsequently, similarly to the case of forming the photosensitive layer, the above-obtained coating solution for a protective layer was applied to the photosensitive layer by use of a glass substrate coater such that the dry film thickness of the protective layer became 1.5 μm. A protective layer was formed by drying at 100° C. for 5 minutes, whereby a photosensitive material for a light-shielding film was prepared.

(2) Subsequently a mask (quartz exposure mask having an image pattern) and the photosensitive material for a light-shielding film were allowed to stand upright, and exposure was carried out at an exposure amount of 70 mJ/cm$^2$ with a proximity-type exposure unit having an ultrahigh pressure mercury lamp (manufactured by Hitachi High-tech Electronics Engineering Co., Ltd.) wherein the distance between the mask surface and the surface on a side of a photosensitive layer of the photosensitive material for a light-shielding film, the side being in contact with an intermediate layer, was set to 200 μm (exposure step). Subsequently, the exposed photosensitive material for a light-shielding film was developed (33° C., 20 sec; development step) by use of a developer (trade name: T-CD1, manufactured by Fuji Photo-Film Co., Ltd.; a solution obtained by diluting an alkali development solution 5-fold with pure water), thereby forming a black matrix on a glass substrate.

In the next place, the glass substrate having the black matrix formed thereon was heated at 220° C. for 60 min by use of a substrate preheater, and was further heated at 240° C. for 50 min to be baked (baking step), thereby preparing a substrate having a black matrix.

The black matrix pattern on the substrate having a light-shielding film had a pixel size of 10 inch and the number of pixels of 480×640. Meanwhile, the width of the black matrix was 24 μm, the aperture of the pixel portion was 86 μm×304 μm and the film thickness of the black matrix (light-shielding film) was 0.7 μm.

<Formation of Colored Layer>

(Preparation of Photosensitive Resin Transfer Material R1>

On a polyethylene terephthalate film temporary support having a thickness of 75 μm, a coating solution for a thermoplastic resin layer, which was made of the following prescription H1, was applied by use of a slit-like nozzle and dried. In the next place, a coating solution for an intermediate layer, that is made of the following prescription P1, was applied and dried. Furthermore, a colored photosensitive resin composition R1 shown in Table 1 was applied and dried. As the result, a thermoplastic resin layer having a dry film thickness of 14.6 μm, an intermediate layer having a dry film thickness of 1.6 μm and a photosensitive resin layer having a dry film thickness of 2.4 μm were provided on the temporary support. A protective film (polypropylene film having a thickness of 12 μm) was pressure bonded thereonto.

Thus, a photosensitive resin transfer material in which the temporary support, the thermoplastic resin layer, the intermediate layer (oxygen-impermeable film) and the red (R) photosensitive resin layer were integrated was prepared, and the sample was named a photosensitive resin transfer material R1.

Coating Solution for Thermoplastic Resin Layer: Prescription H1

| | |
|---|---|
| Methanol | 11.1 parts |
| Propylene glycol monomethyl ether acetate (trade name: MMPGAC, manufactured by Daicel Chemical Industries, Ltd.) | 6.36 parts |
| Methyl ethyl ketone | 52.4 parts |
| Copolymer of methyl methacrylate/2-ethylhexyl acrylate/benzyl methacrylate/methacrylic acid (copolymer composition ratio (molar ratio) = 55/11.7/4.5/28.8, molecular weight = 90,000, Tg ≈ 70° C.) | 5.83 parts |
| Copolymer of styrene/acrylic acid (copolymer composition ratio (molar ratio) = 63/37, molecular weight = 10,000, Tg ≈ 100° C.) | 13.6 parts |
| Compound obtained by dehydration condensation of 2 equivalents of pentaethylene glycol monomethacrylate with bisphenol A (trade name: 2,2-bis[4-(methacryloxypolyethoxy)phenyl]propane, manufactured by Shin-Nakamura Chemical Co., Ltd.) | 9.1 parts |
| Surfactant 1 described above | 0.54 parts |

Coating Solution for Intermediate Layer: Prescription P1

| | |
|---|---|
| PVA205 (polyvinyl alcohol, manufactured by Kuraray Co., Ltd., saponification degree: 88%, polymerization degree: 550) | 32.2 parts |

-continued

| | |
|---|---|
| Polyvinyl pyrrolidone (trade name: K-30, manufactured by ISP Japan) | 14.9 parts |
| Distilled water | 524 parts |
| Methyl alcohol | 429 parts |

(Preparation of Photosensitive Resin Transfer Materials G and B1)

In the next place, photosensitive resin transfer materials G1 and B1 were prepared according to a method similar to the above, except that the colored photosensitive resin composition R1 that was used in the preparation of the photosensitive resin transfer material R1 was changed to colored photosensitive resin compositions G1 and B1 having the compositions shown in the following Table 1.

—Formation of Red (R) Pixel—

After the protective film was peeled off the photosensitive resin transfer material R1, the photosensitive resin transfer material R1 was laminated on the substrate having a black matrix, which had been heated to 100° C., with a laminator (trade name; LAMIC II, manufactured by Hitachi Industries Co., Ltd.) under conditions of a rubber roller temperature of 130° C., a line pressure of 100 N/cm and a travel speed of 2.2 m/min.

After the temporary support was peeled off, the substrate and a mask (quartz exposure mask having an image pattern) were allowed to stand upright, and pattern exposure was carried out by at an exposure amount of 40 mJ/cm$^2$ with a proximity-type exposure unit provided with an ultrahigh pressure mercury lamp (manufactured by Hitachi High-tech Electronics Engineering Co., Ltd.) wherein the distance between the exposure mask surface and the thermoplastic resin layer was set to 200 μm.

Subsequently, development by a shower was conducted with a triethanolamine developer (obtained by diluting a developer (trade name: T-PD2 containing 30% of triethanolamine and also containing a nonionic surfactant and a polypropylene-based defoaming agent, manufactured by Fuji Photo-Film Co., Ltd.) 12-fold with pure water) at 30° C. for 50 sec under a flat nozzle pressure of 0.04 MPa, whereby the thermoplastic resin layer and intermediate layer were removed.

In the next place, development of the photosensitive resin layer by a shower was conducted with a sodium carbonate developer (obtained by diluting a developer (trade name T-CD1 containing 0.38 mole/l of sodium hydrogen carbonate, 0.47 mole/l of sodium carbonate, 5% of sodium dibutyl-naphthalenesulfonate, an anionic surfactant, a defoaming agent and a stabilizer, manufactured by Fuji Photo-Film Co., Ltd.) 5-fold with pure water) at 35° C. for 35 sec under a conical nozzle pressure of 0.15 MPa, so that a patterned image was obtained.

Subsequently, the residue was removed by a nylon-haired rotary brush and a shower of a cleaning agent (obtained by diluting a cleaning agent (trade name: T-SD3, manufactured by Fuji Photo-film Co., Ltd.) 10-fold with pure water) at 33° C. for 20 sec under a conical nozzle pressure of 0.02 MPa, so that red (R) pixels were obtained. Thereafter, post exposure was conducted on the substrate from the resin layer side at 500 mL/cm$^2$ with light from an ultrahigh pressure mercury lamp, followed by a heat treatment at 220° C. for 15 nm ff. Thereby, a substrate where red (R) pixels were formed on the black matrix and at a portion (aperture) surrounded by the black matrix was prepared.

The substrate on which the red (R) pixels were formed was again cleaned with a brush in a similar manner to the above, cleaned by a shower of pure water, and conveyed to a substrate preheater.

—Formation of Green (G) Pixel—

Heat treated green (G) pixels were obtained on the black matrix and on the portion (aperture) surrounded by the black matrix through steps similar to those used for the photosensitive resin transfer material R1, using the photosensitive resin transfer material G1, wherein the exposure amount was set to 40 ml/cm$^2$, and development with the sodium carbonate developer was conducted at 34° C. for 45 sec.

The substrate on which the black matrix and the R and G; pixels were formed was again cleaned with a brush in a similar manner to the above, cleaned by a shower of pure water, and conveyed to a substrate preheater.

—Formation of Blue (B) Pixels— heat treated blue (B) pixels were obtained on the black matrix and on the portion (aperture) surrounded by the black matrix through steps similar to those used for the photosensitive resin transfer material R1, using the photosensitive resin transfer material B1, wherein the exposure amount was set to 30 mJ/cm$^2$, and development with the sodium carbonate developer was conducted at 36° C. for 40 sec for development.

The substrate on which the black matrix and the R, G and B pixels were formed was baked at 240° C. for 50 min, thereby obtaining a color filter substrate on which the respective colored layers were formed.

On the color filter thus formed, an ITO (Indium Tin Oxide) transparent electrode was formed by sputtering, thereby forming a color filter substrate.

TABLE 1

| Colored Photosensitive Resin Composition | R1 | G1 | B1 |
|---|---|---|---|
| R Pigment Dispersion 1 (C.I.P.R. 254) | 44 | — | — |
| R Pigment Dispersion 2 (C.I.P.R. 177) | 5.0 | — | — |
| G Pigment Dispersion 1 | — | 24 | — |
| Y Pigment Dispersion 1 (C.I.P.Y. 150) | — | 13 | — |
| B Pigment Dispersion 1 (C.I.P.B. 15:6) | — | — | 7.2 |
| B Pigment Dispersion 2 (C.I.P.B. 15:6 + C.I.P.V. 23) | — | — | 13 |
| Propylene glycol monomethyl ether acetate | 7.6 | 29 | 23 |
| Methyl ethyl ketone | 37 | 26 | 35 |
| Cyclohexanone | — | 1.3 | — |
| Binder-1 | — | 30 | — |
| Binder-2 | 0.8 | — | — |
| Binder-3 | — | — | 17 |
| DPHA solution | 4.4 | 4.3 | 3.8 |
| 2-trichloromethyl-5-(p-styrylstyryl)-1,3,4-oxadiazole | 0.14 | 0.15 | 0.15 |
| 2,4-bis(trichloromethyl)-6-[4'-(N,N-bisethoxycarbonylmethylamino)-3'-bromophenyl]-s-triazine | 0.058 | 0.060 | — |
| Phenothiazine | 0.010 | 0.005 | 0.020 |
| Additive 1 | 0.52 | — | — |
| Surfactant 1 | 0.060 | 0.070 | 0.050 |

Unit: Parts by mass

Here, the preparation of the colored photosensitive resin compositions R1, G1 and B1 shown in the Table 1 will be described.

(Colored Photosensitive Resin Composition R1)

The colored photosensitive resin composition R1 was obtained as follows: first, R pigment dispersion 1, R pigment dispersion 2 and propylene glycol monomethyl ether acetate (trade name: MMPGAC, manufactured by Daicel Chemical Industries, Ltd.) in the amounts described in Table 1 were weighed out, need at a temperature of 24° C. (±2° C.) and agitated at 150 rpm for 10 min; then, methyl ethyl ketone, Binder 2, the DPHA solution, 2-trichloromethyl-5-(p-styryl-styryl)-1,3,4-oxadiazole, 2,4-bis(trichloromethyl)-6-[4'-(N,N-bisethoxycarbonylmethylamino)-3'-bromophenyl]-s-triazine and phenothiazine in the amounts shown in Table 1 were weighed out, mixed at a temperature of 24° C. (±2° C.) and agitated at 150 rpm for 10 min; then, Additive 1 in the amount shown in Table 1 was weighed out, added at a temperature of 24° C. (±2° C.) and agitated at 150 rpm for 20 min; and Surfactant 1 in the amount shown in Table 1 was weighed out, added at a temperature of 24° C. (±2° C.) and agitated at 30 rpm for 5 min, followed by filtration by use of a #200 nylon mesh.

Among the compositions described in Table 1, compositions of R pigment dispersion 1, R pigment dispersion 2, Binder 2, the DPHA solution and Additive 1 are as follows.

—Composition of R Pigment Dispersion 1—

| | |
|---|---|
| C. I. Pigment Red 254 (trade name: Irgaphor Red B-CF, manufactured by Ciba Specialty Chemicals Inc.) | 8 parts |
| Compound 2 shown below | 0.8 parts |
| Polymer (random copolymer of benzyl methacrylate/methacrylic acid = 72/28 by molar ratio, molecular weight: 37,000) | 8 parts |
| Propylene glycol monomethyl ether acetate (trade name: MMPGAC, manufactured by Daicel Chemical Industries, Ltd.) | 83 parts |

Compound 2

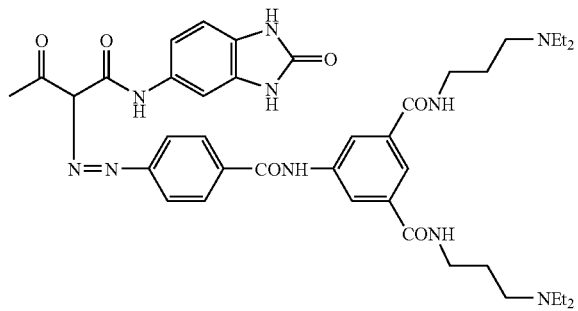

—Composition of R Pigment Dispersion 2—

| | |
|---|---|
| C. I. Pigment Red 177 (trade name: Chromophthal Red A2B, manufactured by Ciba Specialty Chemicals Inc.) | 18 parts |
| Polymer (random copolymer of benzyl methacrylate/methacrylic acid = 72/28 by molar ratio, molecular weight: 37,000) | 12 parts |
| Propylene glycol monomethyl ether acetate (trade name: MMPGAC, manufactured by Daicel Chemical Industries, Ltd.) | 70 parts |

—Composition of Binder 2—

| | |
|---|---|
| Polymer (random copolymer of benzyl methacrylate/methacrylic acid/methyl methacrylate = 38/25/37 by molar ratio, molecular weight: 40,000) | 27 parts |
| Propylene glycol monomethyl ether acetate (trade name: MMPGAC, manufactured by Daicel Chemical Industries, Ltd.) | 73 parts |

—Composition of DPHA Solution—

| | |
|---|---|
| Dipentaerythritol hexaacrylate (trade name: KAYARAD DPHA containing 500 ppm of a polymerization inhibitor MEHQ, manufactured by Nippon Kayaku Co., Ltd.) | 76 parts |
| Propylene glycol monomethyl ether acetate (trade name: MMPGAC, manufactured by Daicel Chemical Industries, Ltd.) | 24 parts |

—Additive 1—

Phosphoric acid ester special activator (trade name: HIPLAAD ED152, manufactured by Kusumoto Chemicals Ltd.)

(Colored Photosensitive Resin Composition G1)

The colored photosensitive resin composition G1 was obtained as follows; first, G pigment dispersion 1, Y pigment dispersion 1 and propylene glycol monomethyl ether acetate (trade name: MMPGAC, manufactured by Daicel Chemical Industries, Ltd.) in the amounts described in Table 1 were weighed out, mixed at a temperature of 24° C. (±2° C.) and agitated at 150 rpm for 10 min; then, methyl ethyl ketone, cyclohexanone, Binder 1, the DPHA solution, 2-trichloromethyl-5-styrylstyryl)-1,3,4-oxadiazole, 2,4-bis(trichloromethyl)-6-[4'-(N,N-bisethoxycarbonylmethylamino)-3'-bromophenyl]-s-triazine and phenothiazine in the amounts shown in Table 4 were weighed out, added in this order at a temperature of 24° C. (±2° C.) and agitated at 150 rpm for 30 min; and Surfactant 1 in the amount shown in Table 1 was weighed out, added at a temperature of 24° C. (*2° C.) and agitated at 30 rpm for 5 min, followed by filtration by use of a #200 nylon mesh.

Among the compositions described in Table 1, the compositions of C pigment dispersion 1, Y pigment dispersion 1 and Binder 1 are as described below.

—Composition of G Pigment Dispersion 1—

GT-2 (trade name, manufactured by FUJIFILM Electronics Materials Co., Ltd.)

—Y Pigment Dispersion 1—

CF Yellow EX3393 (trade name, manufactured by Mikuni Color Ltd.)

—Composition of Binder 1—

| | |
|---|---|
| Polymer (random copolymer of benzyl methacrylate/methacrylic acid = 78/22 molar ratio, molecular weight: 38,000) | 27 parts |
| Propylene glycol monomethyl ether acetate (trade name: MMPGAC, manufactured bu Daicel Chemical Industries, Ltd.) | 73 parts |

(Colored Photosensitive Resin Composition B1)

The colored photosensitive resin composition B1 was obtained as follows: first, B pigment dispersion 1, B pigment dispersion 2 and propylene glycol monomethyl ether acetate (trade name: MMPGAC, manufactured by Daicel Chemical Industries, Ltd.) in the amounts described in Table 1 were weighed out, mixed at a temperature of 24° C. (±2° C.) and agitated at 150 rpm for 10 min; then, methyl ethyl ketone, Binder 3, the DPHA solution, 2-trichloromethyl-5-(p-styrylstyryl)-1,3,4-oxadiazole and phenothiazine in the amounts shown in Table 1 were weighed out, added in this order at a temperature of 25° C. (±2° C.) and agitated at 150 rpm for 30 min at a temperature of 40° C. (±2° C.); and Surfactant 1 in the amount shown in Table 1 was weighed out, added at a temperature of 24° C. (±2° C.) and agitated at 30 rpm for 5 min, followed by filtration by use of a #200 nylon mesh.

Among the compositions described in Table 1, the compositions of B pigment dispersion 1, B pigment dispersion 2 and Binder 3 are as shown below.

—B Pigment Dispersion 1—

CF Blue EX3357 (trade name, manufactured by Mikuni Color Ltd.)

—B Pigment Dispersion 2—

CF Blue EX3383 (trade name, manufactured by Mikuni Color Ltd.)

—Composition of Binder 3—

| | |
|---|---|
| Polymer (random copolymer of benzyl methacrylate/methacrylic acid/methyl methacrylate = 36/22/42 by molar ratio, molecular weight: 38,000) | 27 parts |
| Propylene glycol monomethyl ether acetate (trade name: MMPGAC, manufactured by Daicel Chemical Industries, Ltd.) | 73 parts |

<Preparation of Photospacer>

—Photospacer-Forming Photosensitive Transfer Material—

A photospacer-forming photosensitive transfer material was prepared according to a method similar to the above except that the colored photosensitive resin composition R1 used in the preparation of the photosensitive resin transfer material R1 was changed to a photospacer-forming resin composition having the following composition. The dry layer thickness of the photosensitive resin layer was 4.1 μm.

—Composition of Photospacer-Forming Resin Composition—

| | |
|---|---|
| 1-methoxy-2-propyl acetate | 452 parts |
| Methyl ethyl ketone | 327 parts |
| Methanol | 0.035 parts |
| Binder-4 (copolymer of methacrylic acid/allyl methacrylate (=20/80 [molar ratio], weight average molecular weight: 36,000; polymer)) | 101 parts |
| DPHA solution | 99 parts |
| 2,4-bis(trichloromethyl)-6-[4'-(N,N-bisethoxycarbonylmethylamino)-3'-bromophenyl]-s-triazine | 2.5 parts |
| Hydroquinone monomethyl ether | 0.039 parts |
| Surfactant 1 described above | 0.86 parts |
| Decoloring agent (trade name: Victoria Pure Blue BOH-M, manufactured by Hodogaya Chemical Co., Ltd.) | 17 parts |

—Preparation of Photospacer—

A cover film of the obtained photospacer-forming photosensitive transfer material was peeled off. The surface of the exposed photosensitive resin layer was superposed on the ITO film of the color filter substrate prepared above on which the ITO film was formed by sputtering, and was adhered by use of a laminator (trade name: Lamic II, manufactured by Hitachi Industries Co., Ltd.) at a travel speed of 2 m/min under a pressure and heat condition of a line pressure of 100 N/cm and 130° C. Thereafter, the PET temporary support was peeled off at its interface with the thermoplastic resin layer and removed, so that the photosensitive resin layer was transferred together with the thermoplastic resin layer and the intermediate layer (layer-forming step).

In the next place, a mask (quartz exposure mask having an image pattern) and the color filter substrate were allowed to stand upright in substantially parallel to each other so that the mask and the thermoplastic resin layer faced each other. In this state, proximity exposure was carried out through the mask from a thermoplastic resin layer side at an exposure amount of 60 mJ/cm$^2$ with a proximity-type exposure unit having an ultrahigh pressure mercury lamp (manufactured by Hitachi High-tech Electronics Engineering Co., Ltd.), wherein the distance between the mask surface and the surface on a side of the photosensitive resin layer, the side being in contact with the intermediate layer, was set to 40 μm. Subsequently, development by shower was conducted by spraying a KOH developer (obtained by diluting a developer (trade name: CDK-1, manufactured by FUJIFILM Electronics Materials Co., Ltd.) 100-fold with pure water) from a flat nozzle at a nozzle pressure of 0.04 MPa at 23° C. for 80 sec, so that an unexposed portion was removed by the development, and a pattern (spacer pattern) was obtained (patterning step).

The obtained spacer pattern was formed on an ITO film formed at a portion where the black matrix and the red (R) pixels were laminated and had a transparent columnar shape having a diameter of 16 μm and an average height of 2.0 μm.

In the next place, a color filter substrate 10 on which the spacer pattern was disposed was heated at 230° C. for 30 min (heat treatment step) to prepare a photospacer.

<Preparation of Liquid Crystal Orientation Regulating Protrusion>

—Preparation of Protrusion-Forming Photosensitive Transfer Material—

A protrusion-forming photosensitive transfer material was prepared according to a method similar to the above except that the colored photosensitive resin composition R1 used in the preparation of the photosensitive resin transfer material R1 was changed to a protrusion-forming coating solution prescription C made of the following composition. The dry film thickness of the protrusion-forming photosensitive resin layer for regulating the orientation of a liquid crystal was 2.0 μm.

[Prescription C of Protrusion-Forming Coating Solution]

| | |
|---|---|
| Positive resist solution (trade name: FH-2413F, manufactured by FUJIFILM Electronics materials Co., Ltd.) | 53.3 parts |
| Methyl ethyl ketone | 46.7 parts |
| Surfactant 1 described above | 0.04 parts |

—Formation of Protrusion—

A protective film was peeled off the protrusion-forming photosensitive transfer material obtained above. The exposed surface of the exposed protrusion-forming photosensitive resin layer and the surface on a side where the ITO film of the color filter substrate was disposed (on the color filter) were attached to each other, and laminated with a laminator (trade name: Lamic II, manufactured by Hitachi Industries Co., Ltd.) under conditions of a line pressure of 100 N/cm, a temperature of 130° C. and a travel speed of 2.2 m/min (laminating step). Thereafter; only the PET temporary support of the protrusion-forming photosensitive transfer material was peeled off at its interface with the thermoplastic resin layer and removed. At the time, on the color filter substrate, the photosensitive resin layer, the intermediate layer and the thermoplastic resin layer were laminated in this order from the substrate side.

In the next place, a proximity-type exposure unit was disposed above the thermoplastic resin layer, which is the outermost layer, so that the distance between the mask surface of a photomask and the surface on a side that is in contact with the thermoplastic resin layer became 100 μm. Proximity exposure was carried out through the photomask at an irradiation energy of 70 mJ/cm$^2$ by use of an ultrahigh pressure mercury lamp. Thereafter, an aqueous solution of 1% triethanolamine was sprayed from above the thermoplastic resin by use of a shower developing unit at 30° C. for 30 sec, so as to dissolve and remove the thermoplastic resin layer and the intermediate layer. At this stage, the protrusion-forming photosensitive resin layer was not substantially developed.

Subsequently, an aqueous solution of 2.38% tetramethyl ammonium hydroxide was sprayed to the substrate at 33° C. for 30 sec by use of a shower developing unit to develop and remove an unnecessary portion (exposed portion) of the photosensitive resin layer.

Thereby, on the color filter (ROB pixels), protrusions made of the protrusion-forming photosensitive resin layer which was patterned in a desired shape were formed. In the next place, the color filter substrate on which the protrusions were formed was baked at 240° C. for 50 min, thereby forming, on the color filter RGB pixels), liquid crystal orientation-regulating protrusions that have a height of 1.5 μm and a humpbacked longitudinal-sectional shape.

<Preparation of Substrate (Element) for Liquid Crystal Display>

Separately from the above, a TFT substrate was prepared as a counter substrate. On one surface of the TFT substrate, an ITO (Indium Tin Oxide) film was formed by sputtering. Subsequently, an orientation film made of polyimide was disposed on the ITO film of the TFT substrate and on the ITO film on a side of the color filter substrate where the photospacers were disposed.

Thereafter, a sealing agent including an epoxy resin was printed at a position corresponding to an outer frame of the black matrix that is disposed in the periphery to surround the group of pixels of the color filter, and the color filter substrate was adhered to the TFT substrate. In the next place, the two substrates thus adhered were heated to cure the sealing agent, thereby obtaining a laminate of the two substrates. The laminate was deaerated under a vacuum, then returned to atmospheric pressure, and a liquid crystal was injected into the gap between the two substrates. After the injection, an adhesive was given to the injection port, and sealing was achieved by irradiation of UV rays, so that a liquid crystal cell (liquid crystal display element) was obtained.

On each of both surfaces of thus obtained liquid crystal cell, a polarization plate (trade name: HLC2-2518, manufactured by Sanritz Corporation) was adhered. In the next place, a side-light-type backlight was constituted with FR1112H, DG1112H and DB1112H (trade name, all of them are chip LEDs manufactured by Stanley Electric Co., Ltd.), respectively, as a red R) LED, a green (G) LED and a blue (B) LED, and was disposed on a backside of the liquid crystal cell provided with the polarization plates, thereby preparing an MVA mode liquid crystal display device of the invention.

The molar ratio and number average particle diameter of the tin/silver-tin alloy of the silver-tin alloy portion-containing particles are shown in Table 2 below.

TABLE 2

| | Black Material | | | |
| --- | --- | --- | --- | --- |
| | Metal | Ratio of Ag (% by mole) | Ratio of Sn (% by mole) | Method of forming Light-shielding film | Average Particle Diameter of Composite Particles (nm) |
| Example 1 | Silver/Tin Alloy | 33 | 67 | Coating Method | 25 |
| Example 2 | Silver/Tin Alloy | 79 | 21 | Coating Method | 30 |
| Example 3 | Silver/Tin Alloy | 33 | 67 | Transfer Method | 25 |
| Example 4 | Silver/Tin Alloy | 79 | 21 | Transfer Method | 30 |
| Example 5 | Silver/Tin Alloy | 79 | 21 | Transfer Method | 30 |
| Comparative Example 1 | Silver | 100 | 0 | Coating Method | 50 |
| Comparative Example 2 | Carbon Black | 0 | 0 | Coating Method | — |
| Comparative Example 3 | Carbon Black | 0 | 0 | Coating Method | — |

Example 2

Coating Method

A liquid crystal display device was prepared in a similar manner to Example 1, except that a dispersion liquid (Dispersion liquid A2), in which the amounts of silver (I) acetate and tin (II) acetate used to prepare Dispersion liquid A1 in Example 1 were changed to 54.0 g and 19.8 g, respectively, was used, and the film thickness was changed to the film thickness described in the Table 1.

Example 3

Transfer Method

A liquid crystal display device was prepared in a similar manner to Example 1, except that a photosensitive transfer material prepared as shown below by using the photosensitive coating solution for a light-shielding film of Example 1 was used to prepare a black matrix by the transfer method.

Hereinafter, a production of a photosensitive transfer material and a production of a substrate having a light-shielding film by using the photosensitive transfer material will be detailed.

<Preparation of Photosensitive Transfer Material>

(1) On a surface of a polyethylene terephthalate temporary support having a thickness of 75 μm (PET temporary support), a coating solution for a thermoplastic resin layer having the prescription 12 described below was applied with a slit nozzle so that the dry film thickness became 5 μm, followed by drying at 100° C. for 3 min, thereby forming a thermoplastic resin layer.

(2) On the thermoplastic resin layer, a coating solution for an intermediate layer having the prescription P2 described below was applied with a slit coater so that the dry film thickness became 1.5 μm, followed by drying at 100° C. for 3 min thereby laminating an intermediate layer (3) In the next place, on the intermediate layer, the photosensitive coating solution for a light-shielding film of Example 1 was applied with a slit-shaped nozzle, followed by drying at 100° C. for 5 min, thereby forming a photosensitive layer. Furthermore, on the photosensitive layer, a polypropylene film having a thickness of 12 μm was pressure bonded to form a protective film.

As described above, a photosensitive transfer material having a laminate structure including PET temporary support/ thermoplastic resin layer/intermediate layer/photosensitive layer/protective film was prepared.

[Preparation of Coating Solution for Thermoplastic Resin Layer]

The respective components of the following prescription H2 were mixed to prepare a coating solution for a thermoplastic resin layer.

—Prescription H2 of Coating Solution for Thermoplastic Resin Layer—

| | |
| --- | --- |
| Copolymer of methyl methacrylate/2-ethylhexyl acrylate/benzyl methacrylate/methacrylic acid (=55/11.7/4.5/28.8 [molar ratio]) (weight average molecular weight: 80,000) | 58 parts |
| Copolymer of styrene/acrylic acid (=63/37 [molar ratio]) (weight average molecular weight: 7,000) | 136 parts |
| 2,2-bis[4-(methacryloxypolyethoxy)phenyl]propane (manufactured by Shin-Nakamura Chemical Co., Ltd., polyfunctional acrylate) | 90 parts |
| F-780-F (trade name, manufactured by Dainippon Ink and Chemicals, Incorporated) (30% solution of methyl ethyl ketone of fluorinated surfactant) | 1 part |
| Methyl ethyl ketone | 541 parts |
| 1-methoxy-2-propanol | 63 parts |
| methyl alcohol | 111 parts |

[Preparation of Coating Solution for Intermediate Layer]

The components of the following prescription P2 were mixed to prepare a coating solution for an intermediate layer.

—Prescription P2 of Coating Solution for Intermediate Layer—

| | |
| --- | --- |
| Polyvinyl alcohol (trade name: PVA-205, manufactured by Kuraray Corporation) | 3.0 parts |
| Polyvinyl pyrrolidone (trade name: PVP-K30, manufactured by ISP Japan Co., Ltd.) | 1.5 parts |
| Distilled water | 50.5 parts |
| Methyl alcohol | 45.0 parts |

<Preparation of Substrate Having Light-Shielding Film by Transfer>

(1) First, the protective film of the obtained photosensitive transfer material was peeled off. Then, the exposed photosensitive layer was superposed and brought into contact with a surface of a glass substrate (thickness: 1.1 mm) as a receiving material, and was adhered to the glass substrate by use of a laminator (trade name: Lamic A1, manufactured by Hitachi Industries Co., Ltd.) under conditions of a rubber roller temperature of 130° C., a line pressure of 100 N/cm and a travel speed of 2.2 m/min. Thereafter, the PET temporary support was peeled off, so that the photosensitive layer/the intermediate layer/the thermoplastic resin layer were laminated in this order on the glass substrate (transfer step).

(2) Subsequently, a mask (quartz exposure mask having an image pattern) and the glass substrate were allowed to stand upright in substantially parallel to each other so that the mask and the thermoplastic resin layer faced each other, and exposure to an entire surface was carried out through the mask from the thermoplastic resin layer side at an exposure amount of 300 mJ/cm$^2$ with a proximity-type exposure unit having an ultrahigh pressure mercury lamp (manufactured by Hitachi High-tech Electronics Engineering Co., Ltd.), wherein the distance between the mask surface and the surface on a side in contact with the thermoplastic resin layer of the photosensitive resin layer was set to 200 μm (exposure step).

(3) After the exposure, development by a shower was conducted by spraying a diluted solution of a KOH developer (obtained by diluting CDK-1 (trade name, manufactured by FUJIFILM Electronics Materials Co., Ltd.) 100-fold with pure water) from a flat nozzle onto the thermoplastic resin layer at a nozzle pressure of 6.15 MPa at 25° C. for 58 sec, and so that an unexposed portions of the thermoplastic resin layer, the intermediate layer and the photosensitive layer were removed to obtain a pattern (developing step). Thereafter, ultrapure water was sprayed from an ultrahigh pressure cleaning nozzle to a side of the glass substrate where a pattern was formed at a pressure of 9.8 MPa to remove the residue, thereby forming a black matrix on the glass substrate.

(4) In the next place, the glass substrate on which the black matrix was formed was heated at 220° C. for 60 min by a substrate preheater, and was Her heated at 240° C. for 50 min to be baked (baking step), thereby preparing a substrate having a black matrix.

<Preparation of Liquid Crystal Display Device>

Using the substrate having a black matrix obtained above, a liquid crystal display device was prepared according to a method similar to that of Example 1.

Example 4

Transfer Method

A liquid crystal display device was prepared in a similar manner to Example 3, except that the photosensitive coating solution for a light-shielding film of Example 2, in which Dispersion liquid A2 was used in place of Dispersion liquid A1, was used.

Example 5

Transfer Method

A liquid crystal display device was prepared in a similar manner to Example 4, except that spacers having a diameter of 16 μm and an average height of 3.7 μm were formed, not on the ITO film formed at a portion where the black matrix and the red (R) pixel were laminated but on the ITO film on the black matrix, Comparative Example 1

Preparation of Dispersion Liquid of Silver Fine Particles 73.5 g of silver fine particles having an average aspect ratio of 2.2, 1.05 g of SOLSPERSE 20000 (trade name, producing by Avecia Corp.; dispersing agent) and 16.4 g of methyl ethyl ketone were mixed. The mixture was agitated by use of an ultrasonic dispersing machine (trade name: Ultrasonic Generator Model US-6000 covp, manufactured by Nissei Corp.) thereby obtaining a dispersion liquid of silver fine particles having a circle equivalent diameter of 100 nm.

<Preparation of Photosensitive Coating Solution for Light-Shielding Film>

The following composition was mixed to prepare a photosensitive coating solution for a light-shielding film.

[Composition]

| | |
|---|---|
| Dispersion liquid of silver fine particles (aspect ratio: 2.2) | 40.00 parts |
| Propylene glycol monomethyl ether acetate (trade name: MMPGAC, manufactured by Daicel Chemicals Industries, Ltd.) | 28.6 parts |
| Methyl ethyl ketone | 37.6 parts |
| Fluorinated surfactant (20%) (trade name: F780F, manufactured by Dainippon Ink & Chemicals, Incorporated) | 0.2 parts |
| Hydroquinone monomethyl ether | 0.001 parts |
| Copolymer of benzyl methacrylate/methacrylic acid (molar ratio = 73/27, molecular weight: 30,000) | 2.1 parts |
| Bis[4-[N-[4-(4,6-bistrichloromethyl-s-triazine-2-yl)phenyl]carbamoyl]phenyl]sebacate | 0.1 parts |
| Dipentaerythritol hexaacrylate | added so that a volume ratio of Ag particles became 10% in a dry film |

<Preparation of Coating Solution for Protective Layer>

The following composition was mixed to prepare a coating solution for a protective film.

| | |
|---|---|
| Polyvinyl alcohol (trade name: PVA-205, manufactured by Kuraray Corp.) | 3.0 parts |
| Polyvinyl pyrrolidone (trade name: PVP-K30, ISP Japan Ltd.) | 1.3 parts |
| Distilled water | 50.7 parts |
| Methyl alcohol | 45.0 parts |

<Preparation of Substrate Having Light-Shielding Film>

(1) The obtained photosensitive coating solution for a light-shielding film was applied to a glass substrate by use of a spin coater so that the film thickness became 0.65 μm, and dried at 100° C. for 5 min to form a photosensitive layer. In the next place, the coating solution for a protective film was applied to the photosensitive layer by use of a spin coater so that the dry film thickness became 1.5 μm, and dried at 100° C. for 5 min to form a protective film, thereby preparing a photosensitive material for a light-shielding film.

(2) In the next place, a mask (quartz exposure mask having an image pattern) and the photosensitive material for a light-shielding film were allowed to stand vertically, and exposure was carried out at an exposure amount of 70 mJ/cm$^2$ with an ultrahigh pressure mercury lamp, wherein the distance between the mask surface and the surface on a side of the photosensitive layer of the photosensitive material for a light-shielding film, the side being in contact with the intermediate layer, was set to 200 μm. Then, the exposed photosensitive material for a light-shielding film was developed (33° C., 20 sec) with a developer (trade name: TCD, manufactured by Fuji Photo-Film Co., Ltd.; alkali developer) to form a patterned light-shielding film (black matrix), followed by heating (baking) at 240° C. for 40 min, thereby obtaining a substrate having a black matrix.

Using the above-prepared substrate having a black matrix, a liquid crystal display device was prepared according to a method similar to that of Example 1.

Comparative Example 2

A substrate having a light-shielding film was prepared in the following manner.

An alkali-free glass substrate was cleaned by use of a UV-cleaning device, washed with a brush and a cleaning agent, and subjected to ultrasonic cleaning with ultrapure water. The substrate was heated at 120° C. for 3 min to stabilize a surface state thereof. Thereafter, the substrate was cooled and its temperature was adjusted to 23° C. The substrate was coated with a colored photosensitive resin composition K1 having the composition shown in Table 3 below by use of a coater for glass substrate having a slit-shaped nozzle, MH-1600 (trade name, manufactured by PAS Asia Corporation). Subsequently, by use of a vacuum dryer (trade name: VCD, manufactured by Tokyo Ohka Kogyo Co., Ltd.), the solvent was partially dried for 30 sec to eliminate the fluidity of the coated film, followed by pre-baling at 120° C. for 3 min to form a photosensitive resin layer K1.

Using the photosensitive resin layer K1, a liquid crystal display device was prepared according to a method similar to that of Example 1.

TABLE 3

| Colored Photosensitive Resin Composition | K1 |
|---|---|
| K pigment dispersion 1 | 25 |
| Propylene glycol monomethyl ether acetate | 8 |
| Methyl ethyl ketone | 53 |
| Binder-1 | 9.1 |
| DPHA solution | 4.2 |
| 2,4-bis(trichloromethyl)-6-[4'-(N,N-bisethoxycarbonylmethylamino)-3'-bromophenyl]-s-triazine | 0.160 |
| Hydroquinone monomethyl ether | 0.002 |
| Surfactant 1 | 0.044 |

Unit: parts by mass

The composition of the K pigment dispersion 1 in the Table 3 is as shown below, and the respective compositions of Binder-1, the DPHA solution and Surfactant 1 are as described above.

—Composition of K Pigment Dispersion 1—

| Carbon black (trade name: Special Black 250, manufactured by Degussa GmbH) | 13.1 parts |
|---|---|
| 5-[3-oxo-2-[4-[3,5-bis(3-diethylaminopropylaminocarbonyl)phenyl-]aminocarbonyl]phenylazo]-butyloylaminobenzamidazole | 0.65 parts |
| Polymer (random copolymer of benzyl methacrylate/methacrylic acid (=72/28 [molar ratio] (weight average molecular weight: 37,000)) | 6.72 parts |

| Propylene glycol monomethyl ether acetate (trade name: MMPGAC, manufactured by Daicel Chemical Industries, ltd.) | 79.53 parts |
|---|---|

Comparative Example 3

A liquid crystal display device was prepared in a similar manner to Example 2, except that spacers having a diameter of 16 μm and an average height of 3.7 μm were formed, not on the ITO film formed at a portion where the black matrix and the red (R) pixel were laminated but on the ITO film on the black matrix.

(Evaluation)

Measurements and evaluations shown below were carried out on each of the substrates having a light-shielding film, which were obtained in the examples and comparative examples. The results of the measurements and evaluations are shown in Table 4 below, 1. Optical Density of Light-Shielding Film The optical density of the baked black matrix (light-shielding film) was measured according to a method described below.

The transmission optical density (OD) of the substrate having a light-shielding film was measured at a wavelength of 555 nm with a spectrophotometer (trade name: UV-2100, manufactured by Shimadzu Corporation) and, furthermore, the transmission optical density ($OD^0$) of the glass substrate used in each of the substrates having a light-shielding film was similarly measured. The value obtained by subtracting $OD^0$ from OD (transmission OD; $=OD-OD^0$) was taken as the transmission optical density.

2. Film Thickness of Light-Shielding Film

The film thickness of the baked black matrix (light-shielding film) was measured with a roughness meter (contact stylus profiler) (trade name: P-10, manufactured by TENCOR Corporation).

3. Reflectance of Light-Shielding Film

The absolute reflectance on a glass substrate side (a side opposite to a side where a film is formed) of the substrate having a light-shielding film was measured with an absolute reflectance meter (trade name: ARV-474, manufactured by JASCO Corporation) combined with a spectrophotometer (trade name: V-560, manufactured by JASCO Corporation), and was taken as the reflectance of the substrate having a light-shielding film. The measurement was carried out with a measurement angle set at 5° from a vertical direction and a wavelength of 555 nm.

4. In-Plane Variation of Light-Shielding Film

Film thickness measurement was conducted on the light-shielding film formed on the glass substrate with a roughness meter (contact stylus profiler) (trade name: P-10, manufactured by TENCOR Corporation), and the standard deviation σ of the measurement points was calculated.

5. In-Plane Variation of Spacer

Film thickness measurement was conducted on the light-shielding film formed on the glass substrate with a roughness meter (contact stylus profiler) (trade name: P-10, manufactured by TENCOR Corporation), and the standard deviation a of the measurement points was calculated.

6. Total In-Plane Variation

A R coloring material layer and an ITO were laminated on the light-shielding film prepared on the glass substrate, and spacers were further formed thereon. The total film thickness thereof was measured with a roughness meter (contact stylus profiler) (trade name: P-10, manufactured by TENCOR Corporation), and the standard deviation C of the measurement points was obtained by calculation.

7. Display Unevenness

With respect to each of the liquid crystal display devices, grey display when a grey test signal was inputted was observed visually and with a loupe, and presence or absence of display unevenness was evaluated according to the evaluation criteria shown below.

<Evaluation Criteria>

○: No display unevenness was observed.

Δ: Slight display unevenness was observed.

x: Remarkable display unevenness was observed.

TABLE 4

| | Film Thickness of Light-Shielding Film (μm) | In-Plane Variation of Light-Shielding Film 3σ | Optical Density of Light-Shielding Film | Reflectance of Light-Shielding Film (%) | In-Plane Variation of Spacer 3σ | Total In-Plane Variation | Display Unevenness |
|---|---|---|---|---|---|---|---|
| Example 1 | 0.7 | 0.10 | 4.0 | 1.0 | 0.1 | 0.15 | ○ |
| Example 2 | 0.8 | 0.15 | 4.0 | 0.5 | 0.1 | 0.20 | ○ |
| Example 3 | 0.7 | 0.10 | 4.0 | 1.0 | 0.1 | 0.15 | ○ |
| Example 4 | 0.7 | 0.10 | 3.8 | 0.5 | 0.1 | 0.15 | ○ |
| Example 5 | 0.7 | 0.10 | 4.0 | 1.0 | 0.15 | 0.14 | ○ |
| Comparative Example 1 | 0.8 | 0.15 | 4.0 | 15.0 | 0.1 | 0.20 | ○ |
| Comparative Example 2 | 1.4 | 0.25 | 4.0 | 1.0 | 0.1 | 0.30 | X |
| Comparative Example 3 | 1.4 | 0.25 | 4.0 | 1.0 | 0.1 | 0.28 | X |

As shown in Table 4, Examples in which the metal particles according to the invention were used showed high black densities even in a thin film configuration and were excellent in the hue and reflectance characteristics as well. Furthermore, high optical density is achieved with a thin film. A combination of the thin film black matrix and the spacers with less height fluctuations which were formed on a colored layer formed on the black matrix realized display devices high in the display quality.

On the other hand, Comparative Example 1 that used silver particles was inferior in the reflectance characteristics because of excessively high-reflectance, though it achieved a high black density with a thin film. Furthermore, as shown in Comparative Example 2, when carbon black was used as the black material, it was difficult to obtain the same transmission OD as that of Examples by using a thin film. Still furthermore, as the film thickness of the black matrix became larger, the variations in the cell thickness became larger and display unevenness occurred.

The entire disclosure of Japanese Patent Application No. 2005-344474 is incorporated herein by reference.

Furthermore, all of the documents, patent applications and technical standards described in the present specification are incorporated in the specification by reference to the same extent as the case where all of the documents, patent applications and technical standards are specifically and individually incorporated by reference.

EXPLANATION OF REFERENCE NUMERALS

10: Substrate for Liquid Crystal Display
11: Glass Substrate
12: Colored Layer
13, 22: ITO Film
14: Photospacer
15: Rib
16: Light-shielding film
18: Liquid Crystal Layer
21: TFT Substrate
24: Orientation Film
23, 25: Polarization plate
100, 200: Liquid Crystal Display Element

The invention claimed is:

1. A substrate for liquid crystal display comprising at least:
at least two substrates;
a liquid crystal layer disposed between the substrates;
an electrode that applies an electric field to the liquid crystal layer;
a photospacer that regulates cell thickness between the substrates;
a light-shielding film; and
a colored layer, wherein
at least a part of the photospacer is formed on the light-shielding film or at a portion where the light-shielding film and the colored layer overlap; and
the light-shielding film includes at least one of a resin and a precursor thereof and also includes metal particles having a silver-tin alloy portion.

2. The substrate for liquid crystal display of claim 1, wherein the ratio of silver in the metal particles having a silver-tin alloy portion is in a range of 30 to 80% by mole.

3. The substrate for liquid crystal display device of claim 1, wherein an in-plane height variation of the light-shielding film is within 0.2 μm in terms of 3σ (σ: a standard deviation among measurement points taken every 1 cm on a 1 m×1 m substrate).

4. The substrate for liquid crystal display of claim 1, wherein the amount of the metal particles in the light-shielding film is in a range of 5 to 20% by volume with respect to the total solid content of the light-shielding film.

5. The substrate for liquid crystal display device of claim 1, wherein the light-shielding film is formed by a coating process.

6. The substrate for liquid crystal display device of claim 1, wherein the light-shielding film is formed by a transfer process.

7. The substrate for liquid crystal display device of claim 1, wherein the metal particles have a number average particle size in a range of 20 to 700 mm.

8. A liquid crystal display element, comprising the substrate for liquid crystal display of claim 1.

9. A liquid crystal display device, comprising the liquid crystal display element of claim 8.

* * * * *